US012046250B2

(12) United States Patent
Vasilache

(10) Patent No.: US 12,046,250 B2
(45) Date of Patent: Jul. 23, 2024

(54) DETERMINATION OF SPATIAL AUDIO PARAMETER ENCODING AND ASSOCIATED DECODING

(71) Applicant: Nokia Technologies Oy, Espoo (FI)

(72) Inventor: Adriana Vasilache, Tampere (FI)

(73) Assignee: Nokia Technologies Oy, Espoo (FI)

( * ) Notice: Subject to any disclaimer, the term of this patent is extended or adjusted under 35 U.S.C. 154(b) by 200 days.

(21) Appl. No.: 17/642,288

(22) PCT Filed: Sep. 9, 2020

(86) PCT No.: PCT/FI2020/050578
§ 371 (c)(1),
(2) Date: Mar. 11, 2022

(87) PCT Pub. No.: WO2021/048468
PCT Pub. Date: Mar. 18, 2021

(65) Prior Publication Data

US 2022/0343928 A1 Oct. 27, 2022

(30) Foreign Application Priority Data

Sep. 13, 2019 (GB) ..................................... 1913274

(51) Int. Cl.
*G10L 19/032* (2013.01)
*G10L 19/00* (2013.01)
*G10L 19/008* (2013.01)

(52) U.S. Cl.
CPC ........ *G10L 19/032* (2013.01); *G10L 19/0017* (2013.01); *G10L 19/008* (2013.01)

(58) Field of Classification Search
CPC . G10L 19/032; G10L 19/0017; G10L 19/008; G10L 19/22; G10L 19/0204; G10L 19/24
See application file for complete search history.

(56) References Cited

U.S. PATENT DOCUMENTS 5,978,762 A 11/1999 Smyth et al.
7,668,715 B1 2/2010 Chaugule et al.
(Continued)

FOREIGN PATENT DOCUMENTS

EP 2154910 A1 2/2010
EP 2249334 A1 11/2010
(Continued)

OTHER PUBLICATIONS

Office action received for corresponding Russian Patent Application No. 2022106706, dated Nov. 16, 2022, 6 pages of office action and no page of translation available.
(Continued)

*Primary Examiner* — Phung-Hoang J Nguyen
(74) *Attorney, Agent, or Firm* — Nokia Technologies Oy

(57) ABSTRACT

An apparatus comprising means configured to: generate spatial audio signal directional metadata parameters for a block of time-frequencies; generate encoded spatial audio signal directional metadata parameters (108) for a block of time-frequencies based on a first quantization resolution (203); compare a number of bits used for the encoded spatial audio signal directional parameters (108) for the block of time-frequencies based on the first quantization resolution against a determined number of bits; output or store the encoded spatial audio signal directional metadata parameters for a block of time-frequencies (108) based on a first quantization resolution when the number of bits used for the encoded spatial audio signal directional parameters for the block of time-frequencies (108) based on the first quantization resolution is less than a determined number of bits (217); generate encoded spatial audio signal directional metadata parameters (108) for the block of time-frequencies based on a second quantization resolution when the number
(Continued)

of bits used for the encoded spatial audio signal directional parameters for the block of time-frequencies (108) based on the first quantization resolution is more than the determined number of bits and a difference between the determined number of bits and the number of bits used for the encoded spatial audio signal directional parameters (108) for the block of time-frequencies based on the first quantization resolution is less than a determined number of bits is within a determined threshold (217); generate encoded spatial audio signal directional metadata parameters (108) for the block of time-frequencies based on a third quantization resolution when the number of bits used for the encoded spatial audio signal directional parameters (108) for the block of time-frequencies based on the first quantization resolution is more than the determined number of bits and the difference between the determined number of bits and the number of bits used for the encoded spatial audio signal directional parameters (108) for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits (217).

13 Claims, 11 Drawing Sheets

(56) References Cited

U.S. PATENT DOCUMENTS

| | | | | |
|---|---|---|---|---|
| 8,818,539 | B2 * | 8/2014 | Suzuki | G10L 19/008 381/23 |
| 10,536,793 | B2 * | 1/2020 | Greff | H04R 29/008 |
| 2006/0053006 | A1 | 3/2006 | Kim et al. | |
| 2006/0133619 | A1 * | 6/2006 | Curry | H04N 7/15 381/26 |
| 2009/0030678 | A1 | 1/2009 | Kovesi et al. | |
| 2013/0238344 | A1 | 9/2013 | Chakravarthy et al. | |
| 2014/0355769 | A1 | 12/2014 | Peters et al. | |
| 2017/0309280 | A1 | 10/2017 | Friedrich et al. | |

FOREIGN PATENT DOCUMENTS

| | | | |
|---|---|---|---|
| GB | 2575305 | A | 1/2020 |
| GB | 2575632 | A | 1/2020 |
| GB | 2577698 | A | 4/2020 |
| GB | 2585187 | A | 1/2021 |
| WO | 2009/077152 | A1 | 6/2009 |
| WO | 2018/142017 | A1 | 8/2018 |
| WO | 2019/097017 | A1 | 5/2019 |
| WO | 2019/170955 | A1 | 9/2019 |

OTHER PUBLICATIONS

Partial European Search Report received for corresponding European Patent Application No. 20863003.8, dated Jul. 13, 2023, 12 pages.
Search Report received for corresponding United Kingdom Patent Application No. 1913274.5, dated Mar. 6, 2020, 3 pages.
International Search Report and Written Opinion received for corresponding Patent Cooperation Treaty Application No. PCT/FI2020/050578, dated Dec. 16, 2020, 19 pages.
Hirvonen et al., "Perceptual compression methods for metadata in Directional Audio Coding applied to audiovisual teleconference", Audio Engineering Society, May 7-10, 2009, pp. 1-8.
"Proposal for MASA format", 3GPP TSG-SA4#102 meeting, S4 190121, Agenda: 7.5, Nokia Corporation, Jan. 28-Feb. 1, 2019, pp. 1-10.
Office action received for corresponding Vietnamese Patent Application No. 1-2022-02108, dated May 9, 2022, 1 page of office action and 1 page of translation available.
Office action received for corresponding Japanese Patent Application No. 2022-516079, dated May 16, 2023, 2 pages of office action and 2 pages of translation available.
Office action received for corresponding Indian Patent Application No. 202247020716, dated Aug. 30, 2022, 5 pages.
Extended European Search Report received for corresponding European Patent Application No. 20863003.8, dated Jan. 2, 2024, 13 pages.
Extended European Search Report received for corresponding European Patent Application No. 24157987.9, dated Apr. 19, 2024, 6 pages.

* cited by examiner

DETERMINATION OF SPATIAL AUDIO PARAMETER ENCODING AND ASSOCIATED DECODING

RELATED APPLICATION

This application was originally filed as PCT Application No. PCT/FI2020/050578, filed on Sep. 9, 2020, which claims priority from Great Britain Application No. 1913274.5, filed on Sep. 13, 2019, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as coherence, spread coherence, number of directions, distance etc) for an audio codec. For example, these parameters can be estimated from microphone-array captured audio signals, and for example a stereo signal can be generated from the microphone array signals to be conveyed with the spatial metadata. The stereo signal could be encoded, for example, with an AAC encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonics signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However with respect to the directional components of the metadata, which may comprise an elevation, azimuth (and energy ratio which is 1-diffuseness) of a resulting direction, for each considered time/frequency subband. Quantization of these directional components is a current research topic.

SUMMARY

There is provided according to a first aspect an apparatus comprising means configured to: generate spatial audio signal directional metadata parameters for a block of time-frequencies; generate encoded spatial audio signal directional metadata parameters for the block of time-frequencies based on a first quantization resolution; compare a number of bits used for the encoded spatial audio signal directional parameters for the block of time-frequencies based on the first quantization resolution against a determined number of bits; output or store the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generate encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

The means configured to generate encoded spatial audio signal directional metadata parameters for a block of time-frequencies based on a first quantization resolution may be configured to: determine the first quantization resolution for mapping between the values of the spatial audio signal directional metadata parameter and an index value; generate indices associated with the spatial audio signal directional metadata parameters based on the mapping using the first quantization resolution; selectively encode the indices using a fixed rate or entropy encoding based on whether the fixed rate or entropy encoding uses a fewer number of bits.

The means configured to determine the first quantization resolution for mapping between the values of the spatial audio signal directional metadata parameter and an index value may be configured to determine the first quantization resolution for mapping between the values of the spatial audio signal directional metadata parameter and an index value based on an energy ratio value associated with the spatial audio signal directional metadata parameter.

The means configured to generate encoded spatial audio signal directional metadata parameters for the block of time-frequencies based on a second quantization resolution when a difference between the determined number of bits and the number of bits used for the encoded spatial audio signal directional parameters for the block of time-frequencies based on the first quantization resolution is within a determined threshold may be configured to: determine the second quantization resolution for mapping between the values of the spatial audio signal directional metadata parameter and an index value; generate indices associated with the spatial audio signal directional metadata parameters based on the mapping using the second quantization resolution for spatial audio signal directional metadata parameters which were fixed rate encoded using the first quantization resolution.

The means may be further configured to output or store: the entropy encoded indices associated with the spatial audio signal directional metadata parameters based on the mapping using the first quantization resolution for spatial audio signal directional metadata parameters; and the fixed rate encoded indices associated with the spatial audio signal directional metadata parameters based on the mapping using the second quantization resolution for spatial audio signal directional metadata parameters.

The means may be further configured to order the encoded indices such that the entropy encoded indices precede the fixed rate encoded indices.

The means may be further configured to generate an indicator when the first or second quantization resolution is used.

The means configured to generate encoded spatial audio signal directional metadata parameters for the block of time-frequencies based on a third quantization resolution may be configured to: determine the third quantization resolution for mapping between the values of the spatial audio signal directional metadata parameter and an index value based on a number of bits used for fixed rate encoding using the third quantization resolution is always equal to or less than the determined number of bits; generate indices associated with the spatial audio signal directional metadata parameters based on the mapping using the third quantization resolution; and selectively encode the indices using a fixed rate or entropy encoding based on whether the fixed rate or entropy encoding uses a fewer number of bits.

The means may be further configured to output the selectively encoded indices using a fixed rate or entropy encoding based on whether the fixed rate or entropy encoding uses a fewer number of bits.

The means may be further configured to generate an indicator when the third quantization resolution is determined.

According to a second aspect there is provided an apparatus comprising means configured to: receive encoded spatial audio signal directional metadata parameters for a block of time-frequencies; receive an indicator configured to identify whether the encoded spatial audio signal directional metadata parameters were encoded based on a quantization resolution which always is equal to or less than a determined number of bits; decode the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, the means is configured to: decode a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decode, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else decode the second part comprising fixed rate encoded spatial audio signal directional metadata parameters for the block of time-frequencies based on the further quantization resolution.

The means may further be configured to determine the further quantization resolution for mapping between the values of the spatial audio signal directional metadata parameter and the index value.

The means configured to determine the further quantization resolution for mapping between the values of the spatial audio signal directional metadata parameter and the index value may be configured to determine the further quantization resolution based on an energy ratio value associated with the spatial audio signal directional metadata parameter.

The means may be further configured to determine the reduced bit quantization resolution for mapping between the values of the spatial audio signal directional metadata parameter and the index value.

The means may be configured to generate a mapping from indices associated with the spatial audio signal directional metadata parameters to at least one of an elevation and azimuth value based on the quantization resolution.

According to third aspect there is provided a method comprising: generating spatial audio signal directional metadata parameters for a block of time-frequencies; generating encoded spatial audio signal directional metadata parameters for the block of time-frequencies based on a first quantization resolution; comparing a number of bits used for the encoded spatial audio signal directional parameters for the block of time-frequencies based on the first quantization resolution against a determined number of bits; outputting or storing the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generating encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generating encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

Generating encoded spatial audio signal directional metadata parameters for a block of time-frequencies based on a first quantization resolution may be comprise: determining the first quantization resolution for mapping between the values of the spatial audio signal directional metadata parameter and an index value; generating indices associated with the spatial audio signal directional metadata parameters based on the mapping using the first quantization resolution; selectively encoding the indices using a fixed rate or entropy encoding based on whether the fixed rate or entropy encoding uses a fewer number of bits.

Determining the first quantization resolution for mapping between the values of the spatial audio signal directional metadata parameter and an index value may comprise determining the first quantization resolution for mapping between the values of the spatial audio signal directional metadata parameter and an index value based on an energy ratio value associated with the spatial audio signal directional metadata parameter.

Generating encoded spatial audio signal directional metadata parameters for the block of time-frequencies based on a second quantization resolution when a difference between the determined number of bits and the number of bits used for the encoded spatial audio signal directional parameters for the block of time-frequencies based on the first quantization resolution is within a determined threshold may comprise: determining the second quantization resolution for mapping between the values of the spatial audio signal directional metadata parameter and an index value; generating indices associated with the spatial audio signal directional metadata parameters based on the mapping using the second quantization resolution for spatial audio signal directional metadata parameters which were fixed rate encoded using the first quantization resolution.

The method may further comprise outputting or storing: the entropy encoded indices associated with the spatial audio signal directional metadata parameters based on the mapping using the first quantization resolution for spatial audio signal directional metadata parameters; and the fixed rate encoded indices associated with the spatial audio signal directional metadata parameters based on the mapping using the second quantization resolution for spatial audio signal directional metadata parameters.

The method may further comprise ordering the encoded indices such that the entropy encoded indices precede the fixed rate encoded indices.

The method may further comprise generating an indicator when the first or second quantization resolution is used.

Generating encoded spatial audio signal directional metadata parameters for the block of time-frequencies based on a third quantization resolution may be comprise: determining the third quantization resolution for mapping between the values of the spatial audio signal directional metadata parameter and an index value based on a number of bits used for fixed rate encoding using the third quantization resolution is always equal to or less than the determined number of bits; generate indices associated with the spatial audio signal directional metadata parameters based on the mapping using the third quantization resolution; and selectively encoding the indices using a fixed rate or entropy encoding based on whether the fixed rate or entropy encoding uses a fewer number of bits.

The method may furthermore comprise outputting the selectively encoded indices using a fixed rate or entropy encoding based on whether the fixed rate or entropy encoding uses a fewer number of bits.

The method may further comprise generating an indicator when the third quantization resolution is determined.

According to a fourth aspect there is provided a method comprising: receiving encoded spatial audio signal directional metadata parameters for a block of time-frequencies; receiving an indicator configured to identify whether the encoded spatial audio signal directional metadata parameters were encoded based on a quantization resolution which always is equal to or less than a determined number of bits; decoding the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, the method comprises: decoding a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decoding, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else decoding the second part comprising fixed rate encoded spatial audio signal directional metadata parameters for the block of time-frequencies based on the further quantization resolution.

The method may further comprise determining the further quantization resolution for mapping between the values of the spatial audio signal directional metadata parameter and the index value.

Determining the further quantization resolution for mapping between the values of the spatial audio signal directional metadata parameter and the index value may comprise determining the further quantization resolution based on an energy ratio value associated with the spatial audio signal directional metadata parameter.

The method may comprise determining the reduced bit quantization resolution for mapping between the values of the spatial audio signal directional metadata parameter and the index value.

The method may comprise generating a mapping from indices associated with the spatial audio signal directional metadata parameters to at least one of an elevation and azimuth value based on the quantization resolution.

According to a fifth aspect there is provided an apparatus comprising at least one processor and at least one memory including a computer program code, the at least one memory and the computer program code configured to, with the at least one processor, cause the apparatus at least to: generate spatial audio signal directional metadata parameters for a block of time-frequencies; generate encoded spatial audio signal directional metadata parameters for the block of time-frequencies based on a first quantization resolution; compare a number of bits used for the encoded spatial audio signal directional parameters for the block of time-frequencies based on the first quantization resolution against a determined number of bits; output or store the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generate encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

The apparatus caused to generate encoded spatial audio signal directional metadata parameters for a block of time-frequencies based on a first quantization resolution may be caused to: determine the first quantization resolution for mapping between the values of the spatial audio signal directional metadata parameter and an index value; generate indices associated with the spatial audio signal directional metadata parameters based on the mapping using the first quantization resolution; selectively encode the indices using a fixed rate or entropy encoding based on whether the fixed rate or entropy encoding uses a fewer number of bits.

The apparatus caused to determine the first quantization resolution for mapping between the values of the spatial audio signal directional metadata parameter and an index value may be caused to determine the first quantization resolution for mapping between the values of the spatial audio signal directional metadata parameter and an index value based on an energy ratio value associated with the spatial audio signal directional metadata parameter.

The apparatus caused to generate encoded spatial audio signal directional metadata parameters for the block of time-frequencies based on a second quantization resolution when a difference between the determined number of bits and the number of bits used for the encoded spatial audio signal directional parameters for the block of time-frequencies based on the first quantization resolution is within a determined threshold may be caused to: determine the second quantization resolution for mapping between the values of the spatial audio signal directional metadata parameter and an index value; generate indices associated with the spatial audio signal directional metadata parameters based on the mapping using the second quantization resolution for spatial audio signal directional metadata parameters which were fixed rate encoded using the first quantization resolution.

The apparatus may be caused to output or store: the entropy encoded indices associated with the spatial audio signal directional metadata parameters based on the mapping using the first quantization resolution for spatial audio signal directional metadata parameters; and the fixed rate encoded indices associated with the spatial audio signal directional metadata parameters based on the mapping using the second quantization resolution for spatial audio signal directional metadata parameters.

The apparatus may be caused to order the encoded indices such that the entropy encoded indices precede the fixed rate encoded indices.

The apparatus may be caused to generate an indicator when the first or second quantization resolution is used.

The apparatus caused to generate encoded spatial audio signal directional metadata parameters for the block of time-frequencies based on a third quantization resolution may be caused to: determine the third quantization resolution for mapping between the values of the spatial audio signal directional metadata parameter and an index value based on a number of bits used for fixed rate encoding using the third quantization resolution is always equal to or less than the determined number of bits; generate indices associated with the spatial audio signal directional metadata parameters based on the mapping using the third quantization resolution; and selectively encode the indices using a fixed rate or entropy encoding based on whether the fixed rate or entropy encoding uses a fewer number of bits.

The apparatus may be caused to output the selectively encoded indices using a fixed rate or entropy encoding based on whether the fixed rate or entropy encoding uses a fewer number of bits.

The apparatus may be caused to generate an indicator when the third quantization resolution is determined.

According to a sixth aspect there is provided an apparatus comprising at least one processor and at least one memory including a computer program code, the at least one memory and the computer program code configured to, with the at least one processor, cause the apparatus at least to: receive encoded spatial audio signal directional metadata parameters for a block of time-frequencies; receive an indicator configured to identify whether the encoded spatial audio signal directional metadata parameters were encoded based on a quantization resolution which always is equal to or less than a determined number of bits; decode the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, the apparatus is caused to: decode a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decode, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else decode the second part comprising fixed rate encoded spatial audio signal directional metadata parameters for the block of time-frequencies based on the further quantization resolution.

The apparatus may further be caused to determine the further quantization resolution for mapping between the values of the spatial audio signal directional metadata parameter and the index value.

The apparatus caused to determine the further quantization resolution for mapping between the values of the spatial audio signal directional metadata parameter and the index value may be caused to determine the further quantization resolution based on an energy ratio value associated with the spatial audio signal directional metadata parameter.

The apparatus may be further caused to determine the reduced bit quantization resolution for mapping between the values of the spatial audio signal directional metadata parameter and the index value.

The apparatus may be further caused to generate a mapping from indices associated with the spatial audio signal directional metadata parameters to at least one of an elevation and azimuth value based on the quantization resolution.

According to a seventh aspect there is provided an apparatus comprising: generating circuitry configured to generate spatial audio signal directional metadata parameters for a block of time-frequencies; generating circuitry configured to generate encoded spatial audio signal directional metadata parameters for the block of time-frequencies based on a first quantization resolution; comparing circuitry configured to compare a number of bits used for the encoded spatial audio signal directional parameters for the block of time-frequencies based on the first quantization resolution against a determined number of bits; outputting or storing circuitry configured to output or store the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generating circuitry configured to generate encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generating circuitry configured to generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

According to an eighth aspect there is provided an apparatus comprising: receiving circuitry configured to receive encoded spatial audio signal directional metadata parameters for a block of time-frequencies; receiving circuitry configured to receive an indicator configured to identify whether the encoded spatial audio signal directional metadata parameters were encoded based on a quantization resolution which always is equal to or less than a determined number of bits; decoding circuitry configured to decode the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, the apparatus comprises: decoding circuitry configured to decode a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decoding circuitry configured to decode, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else configured to decode the second part comprising fixed rate encoded spatial audio signal directional metadata parameters for the block of time-frequencies based on the further quantization resolution.

According to a ninth aspect there is provided a computer program comprising instructions [or a computer readable medium comprising program instructions] for causing an apparatus to perform at least the following: generating spatial audio signal directional metadata parameters for a block of time-frequencies; generating encoded spatial audio signal directional metadata parameters for the block of time-frequencies based on a first quantization resolution; comparing a number of bits used for the encoded spatial audio signal directional parameters for the block of time-frequencies based on the first quantization resolution against a determined number of bits; outputting or storing the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generating encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generating circuitry configured to generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

According to a tenth aspect there is provided a computer program comprising instructions [or a computer readable medium comprising program instructions] for causing an apparatus to perform at least the following: receiving encoded spatial audio signal directional metadata parameters for a block of time-frequencies; receiving an indicator configured to identify whether the encoded spatial audio signal directional metadata parameters were encoded based on a quantization resolution which always is equal to or less than a determined number of bits; decoding the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, performing: decoding a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decoding, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else decoding the second part comprising fixed rate encoded spatial audio signal directional metadata parameters for the block of time-frequencies based on the further quantization resolution.

According to an eleventh seventh aspect there is provided a non-transitory computer readable medium comprising program instructions for causing an apparatus to perform at least the following: generating spatial audio signal directional metadata parameters for a block of time-frequencies; generating encoded spatial audio signal directional metadata parameters for the block of time-frequencies based on a first quantization resolution; comparing a number of bits used for the encoded spatial audio signal directional parameters for the block of time-frequencies based on the first quantization resolution against a determined number of bits; outputting or storing the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generating encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generating circuitry configured to generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

According to a twelfth seventh aspect there is provided a non-transitory computer readable medium comprising program instructions for causing an apparatus to perform at least the following: receiving encoded spatial audio signal directional metadata parameters for a block of time-frequencies; receiving an indicator configured to identify whether the encoded spatial audio signal directional metadata parameters were encoded based on a quantization resolution which always is equal to or less than a determined number of bits; decoding the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, performing: decoding a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decoding, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else decoding the second part comprising fixed rate encoded spatial audio signal directional metadata parameters for the block of time-frequencies based on the further quantization resolution.

According to a thirteenth aspect there is provided an apparatus comprising: means for generating spatial audio signal directional metadata parameters for a block of time-frequencies; generating encoded spatial audio signal directional metadata parameters for the block of time-frequencies based on a first quantization resolution; means for comparing a number of bits used for the encoded spatial audio signal directional parameters for the block of time-frequencies based on the first quantization resolution against a determined number of bits; means for outputting or storing the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; means for generating encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; means for generating circuitry configured to generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

According to a fourteenth aspect there is provided an apparatus comprising: means for receiving encoded spatial audio signal directional metadata parameters for a block of time-frequencies; means for receiving an indicator configured to identify whether the encoded spatial audio signal directional metadata parameters were encoded based on a quantization resolution which always is equal to or less than a determined number of bits; means for decoding the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, means for: decoding a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; means for decoding, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else means for decoding the second part comprising fixed rate encoded spatial audio signal directional metadata parameters for the block of time-frequencies based on the further quantization resolution.

According to a fifteenth aspect there is provided a computer readable medium comprising program instructions for causing an apparatus to perform at least the following: generating spatial audio signal directional metadata parameters for a block of time-frequencies; generating encoded spatial audio signal directional metadata parameters for the block of time-frequencies based on a first quantization resolution; comparing a number of bits used for the encoded spatial audio signal directional parameters for the block of time-frequencies based on the first quantization resolution against a determined number of bits; outputting or storing the encoded spatial audio signal directional metadata parameters for the block of time-frequencies based on a first quantization resolution when the number of bits used for the encoded spatial audio signal directional parameters for the block of time-frequencies based on the first quantization resolution is less than a determined number of bits; generating encoded spatial audio signal directional metadata parameters for the block of time-frequencies based on a second quantization resolution when the number of bits used for the encoded spatial audio signal directional parameters for the block of time-frequencies based on the first quantization resolution is more than the determined number of bits and a difference between the determined number of bits and the number of bits used for the encoded spatial audio signal directional parameters for the block of time-frequencies based on the first quantization resolution is less than a determined number of bits is within a determined threshold; generating circuitry configured to generate encoded spatial audio signal directional metadata parameters for the block of time-frequencies based on a third quantization resolution when the number of bits used for the encoded spatial audio signal directional parameters for the block of time-frequencies based on the first quantization resolution is more than the determined number of bits and the difference between the determined number of bits and the number of bits used for the encoded spatial audio signal directional parameters for the block of time-frequencies based on the first quantization resolution is greater than the determined threshold, wherein the third quantization resolution is determined such that a number of bits used for the encoded spatial audio signal directional parameters for the block of time-frequencies based on the third quantization resolution is always equal to or less than the determined number of bits.

According to a sixteenth aspect there is provided a computer readable medium comprising program instructions for causing an apparatus to perform at least the following: receiving encoded spatial audio signal directional metadata parameters for a block of time-frequencies; receiving an indicator configured to identify whether the encoded spatial audio signal directional metadata parameters were encoded based on a quantization resolution which always is equal to or less than a determined number of bits; decoding the encoded spatial audio signal directional metadata parameters for the block of time-frequencies based on a quantization resolution which always is equal to or less than a determined number of bits when the indicator identifies that the encoded spatial audio signal directional metadata parameters were encoded based on a quantization resolution which always is equal to or less than a determined number of bits; and when the indicator identifies that the encoded spatial audio signal directional metadata parameters were not encoded based on a quantization resolution which always is equal to or less than a determined number of bits, performing: decoding a first part of the encoded spatial audio signal directional metadata parameters for the block of time-frequencies based on a further quantization resolution, the first part comprising entropy encoded spatial audio signal directional metadata parameters for the block of time-frequencies based on the further quantization resolution; decoding, when the difference between the determined number of bits and a number of bits used to encode the first part is less than a number of bits required to encode a second part of the encoded spatial audio signal directional metadata parameters for the block of time-frequencies based on the further quantization resolution, the second part comprising fixed rate encoded spatial audio signal directional metadata parameters for the block of time-frequencies based on a reduced bit quantization resolution, else decoding the second part comprising fixed rate encoded spatial audio signal directional metadata parameters for the block of time-frequencies based on the further quantization resolution.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
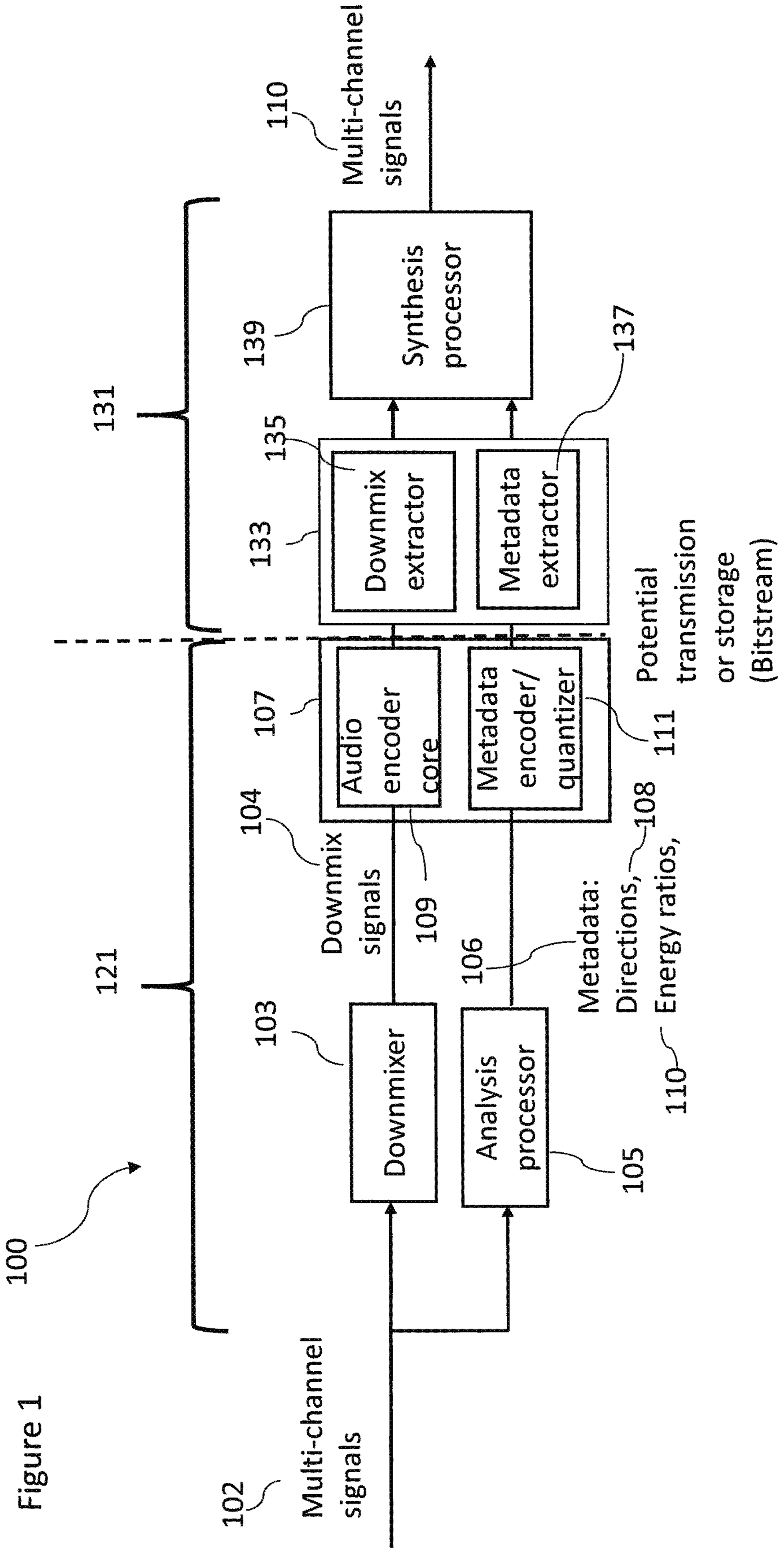
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, Ambisonics (FOA/HOA) etc. It is understood that in some embodiments the channel location is based on a location of the microphone or is a virtual location or direction. Furthermore the output of the example system is a multi-channel loudspeaker arrangement. However it is understood that the output may be rendered to the user via means other than loudspeakers. Furthermore the multi-channel loudspeaker signals may be generalised to be two or more playback audio signals.

The metadata consists at least of elevation, azimuth and the energy ratio of a resulting direction, for each considered time/frequency sub-band. The direction parameter components, the azimuth and the elevation are extracted from the audio data and then quantized to a given quantization resolution. The resulting indexes must be further compressed for efficient transmission. For high bitrate, high quality lossless encoding of the metadata is needed.

The concept as discussed hereafter is to improve the quality of encoded and quantized representation of metadata in situations when following initial quantization and encoding of the bitrate obtained is larger than a bitrate allowed by the codec. In such embodiments there is proposed a method of obtaining an intermediary quantization resolution without any re-estimation of entropy coding bits nor any supplementary signalling of the modification. The reduction is therefore performed only for those sub-bands that use fixed rate encoding and the implicit signalling is implemented by reordering of the sub-bands when writing the bitstream to be output.

In some embodiments this can be further implemented with methods which reduce values of the variables to be encoded. The reduction can be implemented in some embodiments for the case when there are a higher number of symbols. The change can be performed by subtracting from the number of symbols available the index to be encoded and encoding the resulting difference. In some embodiments, for an azimuth representation this corresponds to having audio sources situated with a bias to the rear. In addition, the change can also be implemented in some embodiments by checking if all indexes are even or if all indexes are odd and encoding the values divided by two. For an elevation representation, in some embodiments this corresponds to having the audio sources mainly situated on the upper or the lower side of audio scene.

In some embodiments the encoding of the MASA metadata, for example within an IVAS codec, is configured to first estimate the number of bits for the directional data based on the values of the quantized energy ratios for each time frequency tile. Furthermore the entropy encoding of the original quantization resolution is tested. If the resulting sum is larger than the amount of available bits, the number of bits can be proportionally reduced for each time frequency tile such that it fits the available number of bits, however the quantization resolution is not unnecessarily adjusted when the bitrate allows it (for example in higher bitrates).

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example in some embodiments the spatial analyser and the spatial analysis may be implemented external to the encoder. For example in some embodiments the spatial metadata associated with the audio signals may be a provided to an encoder as a separate bit-stream. In some embodiments the spatial metadata may be provided as a set of spatial (direction) index values.

The multi-channel signals are passed to a downmixer 103 and to an analysis processor 105.

In some embodiments the downmixer 103 is configured to receive the multi-channel signals and downmix the signals to a determined number of channels and output the downmix signals 104. For example the downmixer 103 may be configured to generate a 2 audio channel downmix of the multi-channel signals. The determined number of channels may be any suitable number of channels. In some embodiments the downmixer 103 is optional and the multi-channel signals are passed unprocessed to an encoder 107 in the same manner as the downmix signal are in this example.

In some embodiments the analysis processor 105 is also configured to receive the multi-channel signals and analyse the signals to produce metadata 106 associated with the multi-channel signals and thus associated with the downmix signals 104. The analysis processor 105 may be configured to generate the metadata which may comprise, for each time-frequency analysis interval, a direction parameter 108 and an energy ratio parameter 110 (and in some embodiments a coherence parameter, and a diffuseness parameter). The direction and energy ratio may in some embodiments be considered to be spatial audio parameters. In other words the spatial audio parameters comprise parameters which aim to characterize the sound-field created by the multi-channel signals (or two or more playback audio signals in general).

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The downmix signals 104 and the metadata 106 may be passed to an encoder 107.

The encoder 107 may comprise an audio encoder core 109 which is configured to receive the downmix (or otherwise) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a downmix extractor 135 which is configured to decode the audio signals to obtain the downmix signals. Similarly the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and downmix audio signals may be passed to a synthesis processor 139.

The system 100 'synthesis' part 131 further shows a synthesis processor 139 configured to receive the downmix and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the downmix signals and the metadata.

Therefore in summary first the system (analysis part) is configured to receive multi-channel audio signals. Then the system (analysis part) is configured to generate a downmix or otherwise generate a suitable transport audio signal (for example by selecting some of the audio signal channels). The system is then configured to encode for storage/transmission the downmix (or more generally the transport) signal. After this the system may store/transmit the encoded downmix and metadata. The system may retrieve/receive the encoded downmix and metadata. Then the system is configured to extract the downmix and metadata from encoded downmix and metadata parameters, for example demultiplex and decode the encoded downmix and metadata parameters.

The system (synthesis part) is configured to synthesize an output multi-channel audio signal based on extracted downmix of multi-channel audio signals and metadata.

Figure 2:
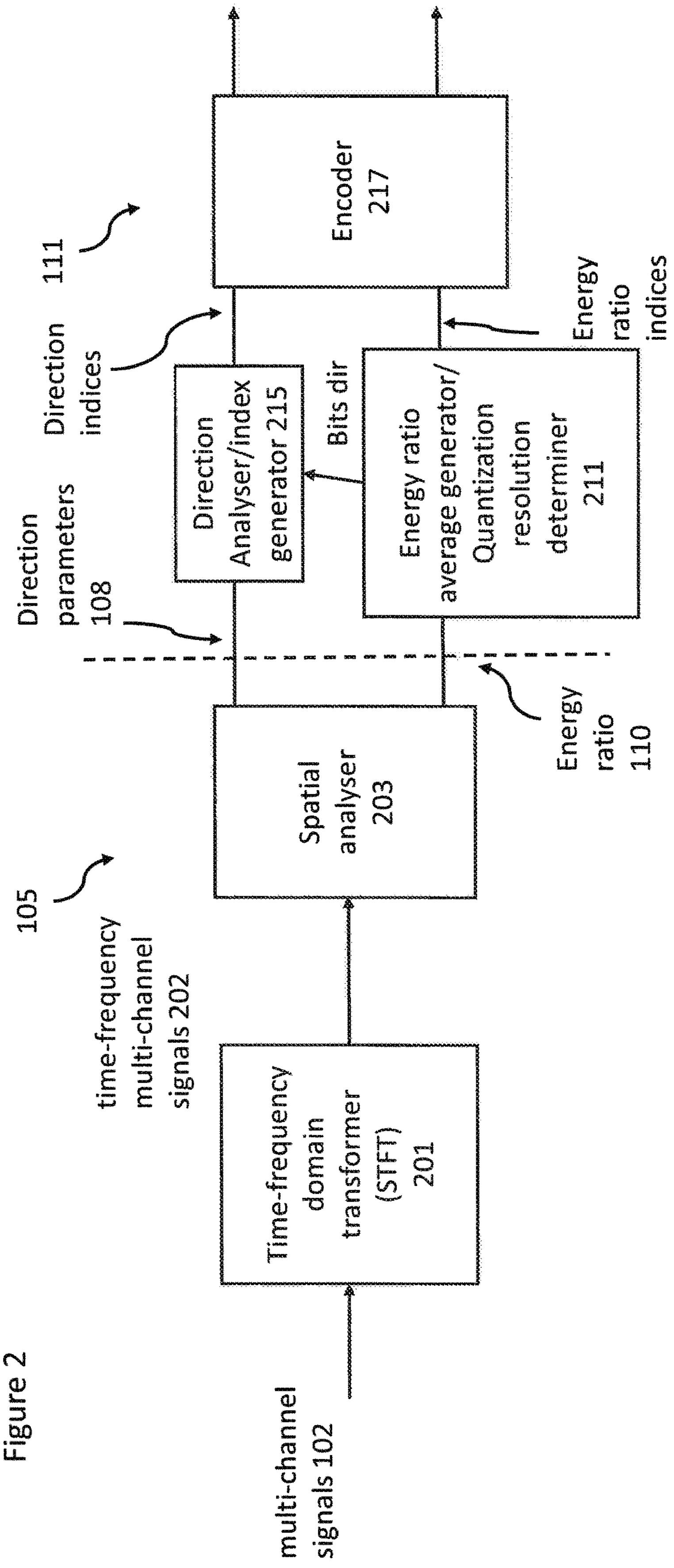
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203 and to a signal analyser 205.

Thus for example the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub-bands that group one or more of the bins into a sub-band of a band index k=0, . . . , K−1. Each sub-band k has a lowest bin $b_{k,low}$ and a highest bin $b_{k,high}$, and the subband contains all bins from $b_{k,low}$ to $b_{k,high}$. The widths of the sub-bands can approximate any suitable distribution. For example the Equivalent rectangular bandwidth (ERB) scale or the Bark scale.

In some embodiments the analysis processor 105 comprises a spatial analyser 203. The spatial analyser 203 may be configured to receive the time-frequency signals 202 and based on these signals estimate direction parameters 108. The direction parameters may be determined based on any audio based 'direction' determination.

For example in some embodiments the spatial analyser 203 is configured to estimate the direction with two or more signal inputs. This represents the simplest configuration to estimate a 'direction', more complex processing may be performed with even more signals.

The spatial analyser 203 may thus be configured to provide at least one azimuth and elevation for each frequency band and temporal time-frequency block within a frame of an audio signal, denoted as azimuth φ(k,n) and elevation θ(k,n). The direction parameters 108 may be also be passed to a direction analyser/index generator 215.

The spatial analyser 203 may also be configured to determine an energy ratio parameter 110. The energy ratio may be the energy of the audio signal considered to arrive from a direction. The direct-to-total energy ratio r(k,n) can be estimated, e.g., using a stability measure of the directional estimate, or using any correlation measure, or any other suitable method to obtain a ratio parameter. The energy ratio may be passed to an energy ratio average generator/quantization resolution determiner 211.

Therefore in summary the analysis processor is configured to receive time domain multichannel or other format such as microphone or Ambisonics audio signals.

Following this the analysis processor may apply a time domain to frequency domain transform (e.g. STFT) to generate suitable time-frequency domain signals for analysis and then apply direction analysis to determine direction and energy ratio parameters.

The analysis processor may then be configured to output the determined parameters.

Although directions and ratios are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

As also shown in FIG. 2 an example metadata encoder/quantizer 111 is shown according to some embodiments.

As discussed above the audio spatial metadata consists of azimuth, elevation, and energy ratio data for each sub-band. In the MASA format the directional data is represented on 16 bits such that the azimuth is approximately represented on 9 bits, and the elevation on 7 bits. The energy ratio is represented on 8 bits. For each frame there are N=5 sub-bands and M=4 time blocks, making that (16+8)×M×N bits to be needed to store the uncompressed metadata for each frame. In a higher frequency resolution version, there could be 20 or 24 frequency sub-bands. Although in the following examples the MASA format bit allocations are used it is understood that other embodiments may be implemented with other bit allocation, or sub-band or time block choices and these are representative examples only.

The metadata encoder/quantizer 111 may comprise an energy ratio average generator/quantization resolution determiner 211. The energy ratio average generator/quantization resolution determiner 211 may be configured to receive the energy ratios and from the analysis and from this generate a suitable encoding of the ratios. For example to receive the determined energy ratios (for example direct-to-total energy ratios, and furthermore diffuse-to-total energy ratios and remainder-to-total energy ratios) and encode/quantize these. These encoded forms may be passed to the encoder 217.

In some embodiments the energy ratio average generator/quantization resolution determiner 211 is configured to encode each energy ratio value using a determined number of bits. For example in the above case where there are N=5 sub-bands 3 bits are used to encode each energy ratio value. The energy ratio average generator/quantization resolution determiner 211 thus may be configured to apply a scalar non-uniform quantization using 3 bits for each sub-band.

Additionally the energy ratio average generator/quantization resolution determiner 211 is configured to, rather than controlling the transmitting/storing of all of the energy ratio values for all TF blocks, generate only one weighted average value per sub-band which is passed to the encoder to be transmitted/stored.

In some embodiments this average is computed by taking into account the total energy of each time-frequency block and the weighting applied based on the sub-bands having more energy.

Additionally the energy ratio average generator/quantization resolution determiner 211 is configured to determine the quantization resolution for the direction parameters (in other words a quantization resolution for elevation and azimuth values) for all of the time-frequency blocks in the frame. This bit allocation may for example be defined by bits_dir0 [0:N−1][0:M−1] and may be passed to the direction analyser/index generator 215.

Figure 3:
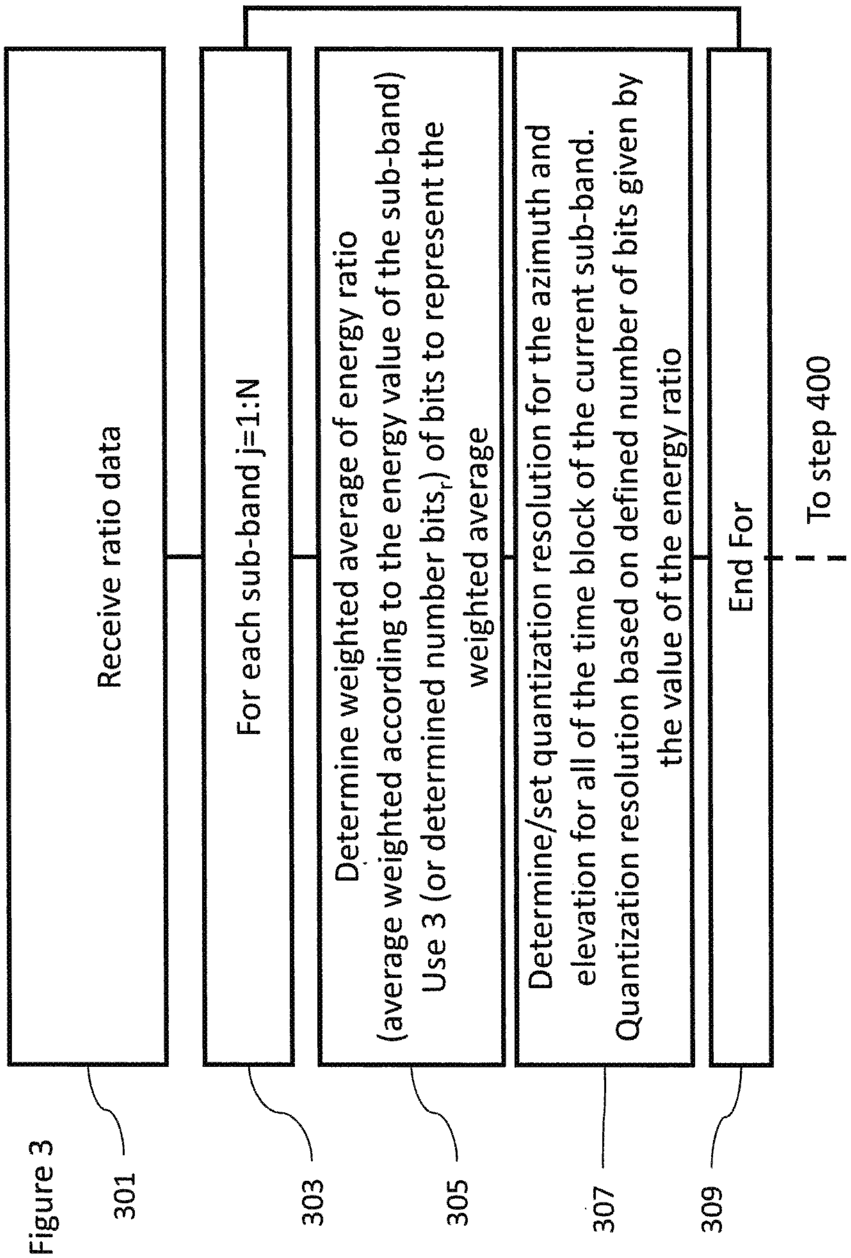
FIG. 3 show a flow diagram of energy ratio encoding and quantization resolution determination operations as shown in FIG. 2 according to some embodiments.

As shown in FIG. 3 the actions of the energy ratio average generator/quantization resolution determiner 211 can be summarised. The first step is one of receiving the ratio values as shown in FIG. 3 by step 301. Then the sub-band loop is started in FIG. 3 by step 303. The sub-band loop comprises a first action of using a determined number of bits (for example 3) to represent the energy ratio value based on the weighted average of the energy ratio value for all of the values within the time block (where the weighting is determined by the energy value of the audio signal) as shown in FIG. 3 by step 305. Then the second action is one determined the quantization resolution for the azimuth and elevation for all of the time block of the current sub-band based on the value of the energy ratio as shown in FIG. 3 by step 307. The loop is closed in FIG. 3 by step 309.

This can furthermore be represented in pseudocode by the following

1. For each sub-band i=1:N
   a. Use 3 bits to encode the corresponding energy ratio value
   b. Set the quantization resolution for the azimuth and the elevation for all the time block of the current sub-band. The quantization resolution is set by allowing a predefined number of bits given by the value of the energy ratio, bits_dir0[0:N−1][0:M−1]
2. End for The metadata encoder/quantizer 111 may comprise a direction analyser/index generator 215. The direction index generator 215 is configured to receive the direction parameters (such as the azimuth φ(k, n) and elevation θ(k, n) 108 and the quantization bit allocation and from this generate a quantized output. In some embodiments the quantization is based on an arrangement of spheres forming a spherical grid arranged in rings on a 'surface' sphere which are defined by a look up table defined by the determined quantization resolution. In other words the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

For example in some embodiments the bits for direction parameters (azimuth and elevation) are allocated according to the table bits_direction[ ]; if the energy ratio has the index i, the number of bits for the direction is bits_direction[i].

const short bits_direction[ ]={3, 5, 6, 8, 9, 10, 11, 11};

The structure of the direction quantizers for different bit resolutions is given by the following variables:

```
                const short no_theta[ ] = /* from 1 to 11 bits */
                {/*1,      - 1 bit
                1,*/       /* 2 bits */
                2,         /* 3 bits */
                2,         /* 4 bits */
                4,         /* 5 bits */
                5,         /* 6 bits */
                6,         /* 7 bits */
                7,         /* 8 bits */
                10,        /* 9 bits */
                14,        /* 10 bits */
                19         /* 11 bits */
                };
const short no_phi[NO_SPHERICAL_GRIDS][MAX_NO_THETA] = /* from 1 to 11 bits*/
{
              { 2 },
              { 4 },
              { 4,    2 },
              { 8,    4 }, /* 8, 4*/
              { 12,   7,   2,    1 }, /* 12, */
              { 14,   13,  9,    2,   1 },
              { 22,   21,  17,   11,  3,    1 },
              { 33,   32,  29,   23,  17,   9,   1 },
              { 48,   47,  45,   41,  35,   28,  20, 12,  2,  1 },
              { 60,   60,  58,   56,  54,   50,  46, 41, 36, 30, 23,
17,             10,   1 },
              { 89,   89,  88,   86,  84,   81,  77, 73, 68, 63, 57,
51,             44,   38,  30,   23,  15,   8,   1 }
                };
```

'no_theta' corresponds to the number of elevation values in the 'North hemisphere' of the sphere of directions, including the Equator. 'no_phi' corresponds to the number of azimuth values at each elevation for each quantizer.

For instance for 5 bits there are 4 elevation values corresponding to [0, 30, 60, 90] and 4−1=3 negative elevation values [−30, −60, −90]. For the first elevation value, 0, there are 12 equidistant azimuth values, for the elevation values 30 and −30 there are 7 equidistant azimuth values and so on.

All quantization structures with the exception of the structure corresponding to 4 bits have the difference between consecutive elevation values given by 90 degrees divided by the number of elevation values 'no_theta'. This is an example and any other suitable distribution may be implemented. For example in some embodiments there may be implemented a spherical grid for 4 bits that might have no points under the Equator. Similarly the 3 bits distribution may be spread on the sphere or restricted to the Equator only. In such a manner the indices can be considered to be a fixed rate encoding of the direction parameters.

Having determined the direction indices the direction analyser/index generator 215 can then be configured to entropy encode the azimuth and elevation indices. The entropy coding is implemented for one frequency sub-band at a time, encoding all the time subframes for that sub-band. This means that for instance the best GR order is determined for the 4 values corresponding to the time subframes of a current sub-band. Furthermore as discussed herein when there are several methods to encode the values for one sub-band one of the methods is selected as discussed later. The entropy encoding of the azimuth and the elevation indexes in some embodiments may be implemented using a Golomb Rice encoding method with two possible values for the Golomb Rice parameter. In some embodiments the entropy coding may also be implemented using any suitable entropy coding technique (for example Huffman, arithmetic coding . . . ).

Having fixed rate and entropy encoded the direction indices (the elevation and azimuth indices in this example) then the direction analyser/index generator 215 can then be configured to compare for each of the sub-bands the number of bits used by the entropy coding (EC) method to a fixed rate encoding method and select for each sub-band the encoding method which uses the fewer number of bits. Thus the bits_EC is the sum of the bits used in each sub-band irrespective of whether fixed or variable rate encoding is used. For the sub-bands where fixed rate encoding is used, the number of bits used for each direction is given by bits_dir0[i][j], where "i" is the index of the sub-band and "j" is the index of the time subframe.

Suppose the bits for each sub-band, after the entropy encoding are as follows:

| Sub-band index | Coding type | Bits used per sub-band |
|---|---|---|
| 0 | Fixed rate | Sum(bits_dir0[0][i]) |
| 1 | EC | Bits_EC_1 |
| 2 | Fixed rate | Sum(bits_dir0[2][i]) |
| 3 | EC | Bits_EC_3 |
| 4 | EC | Bits_EC_4 |

Then the number of bits used to encode the time-block or frame is then compared to the number of bits available. For example in some embodiments a value delta can be calculated which is the difference between the number of bits used to encode the time-block or frame (bits_EC) and bits available.

In some embodiments the direction analyser/index generator 215 is configured to determine whether the difference value (delta) negative. In other words whether the number of bits for Encoded Direction Indices (using both the fixed rate and entropy encoded sub-bands) is more than bits available.

Where the number of bits used is not more than the bits available (or delta is positive or not negative) then the encoder 217 is configured to use the (bits_EC) Encoded Direction Indices and signal which subframes are Entropy encoded and which are Fixed rate encoded. For example in some embodiments the encoder is configured to signal 1 bit to indicate that the EC+Fixed rate method is used, also 1 bit per sub-band to is then used to indicate whether the sub-band is Fixed rate or Entropy encoded. Then the encoded sub-bands are grouped. For example the entropy encoded sub-bands are grouped and then the fixed rate encoded sub-bands follow.

Figure 4A:
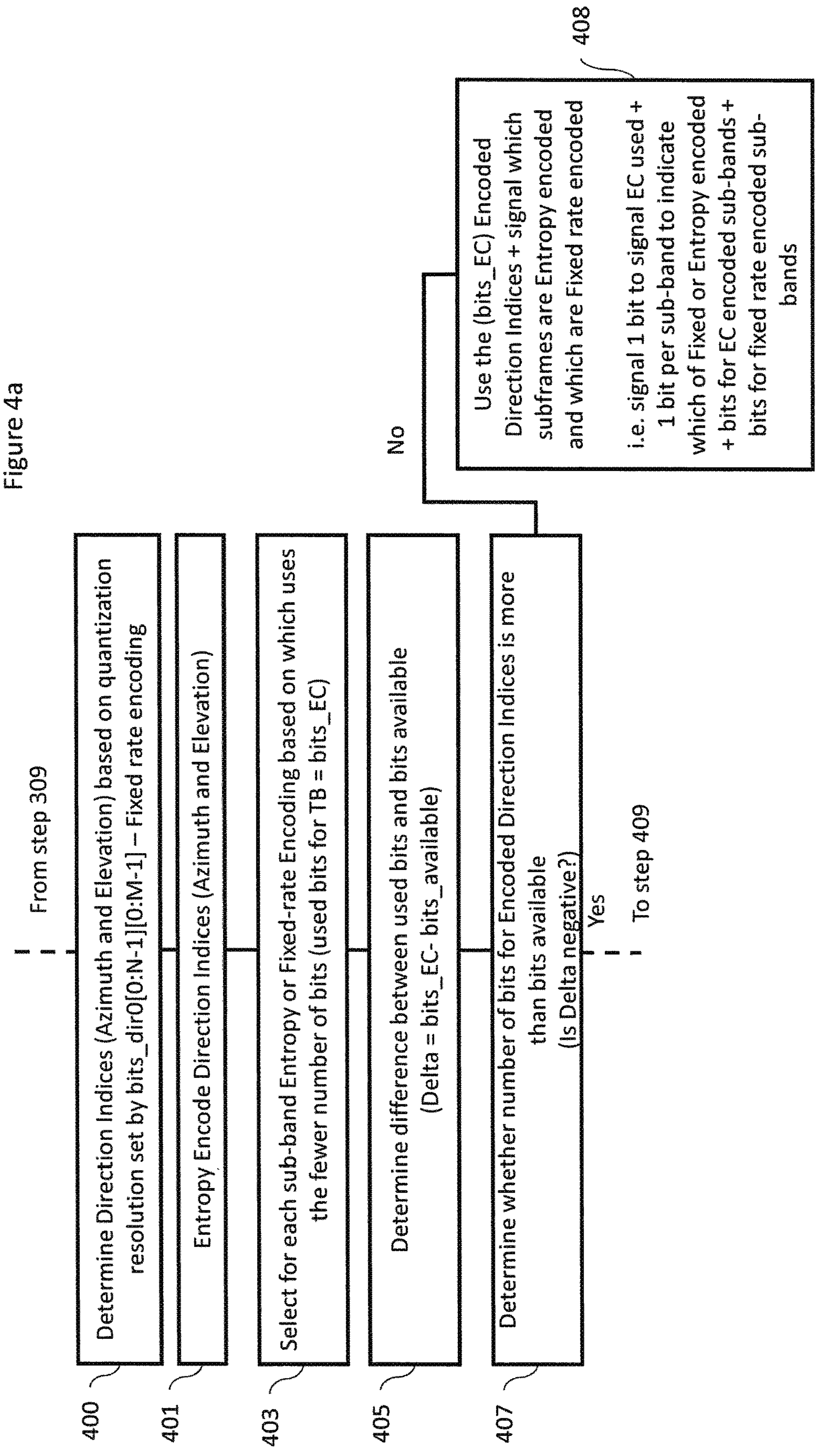
FIGS. 4*a* to 4*c* show flow diagrams of direction index generation and direction index encoding operations as shown in FIG. 2 according to some embodiments.

This for example is shown in FIG. 4*a* wherein the initial operation following step 309 is one of determining Direction Indices (Azimuth and Elevation) based on quantization resolution set by bits_dir0[0:N−1][0:M−1], in other words performing Fixed rate encoding as shown in FIG. 4*a* by step 400.

Having generated the indices the next operation is to entropy encode the direction indices as shown in FIG. 4*a* by step 401.

Having generated for all of the sub-bands an entropy encoded and fixed rate encoded form then for each sub-band the option which uses the fewer number of bits is selected, and the used bits for the time-block or frame is determined (as bits_EC) as shown in FIG. 4*a* by step 403.

Then the difference between the used bits and bits available is determined (Delta=bits_EC-bits_available) as shown in FIG. 4*a* by step 405.

The next operation may be one of determining whether number of bits for Encoded Direction Indices is more than the bits available (in other words is Delta negative?) as shown in FIG. 4*a* by step 407.

Where the determination results in the answer that the number of bits for the Encoded Direction Indices is not more than the bits available (in other words the Delta value is not negative or is positive) then the encoded Direction Indices are used and furthermore the selections signalled (in other words indicators generated to signal which subframes are Entropy encoded and which are Fixed rate encoded) as shown in FIG. 4*a* by step 408. In some embodiments the using 1 bit to signal that the EC selection method is used, using 1 bit per sub-band to indicate which are Fixed or Entropy encoded and then grouping the encoded metadata such that all of the entropy encoded sub-bands are packed in the bitstream first and then then the fixed rate encoded sub-bands packed.

In some embodiments where the number of bits for Encoded Direction Indices is more than bits available (or Delta is negative) then the direction analyser/index generator 215 is configured to determine whether the number of bits used for the Encoded Direction Indices is more than bits available by a quantization resolution reduction threshold value. The quantization resolution reduction threshold value can in some embodiments be calculated based on the number of fixed rate encoded sub-bands, the number of bits which can be reduced from each time-frequency tile (or block of time-frequencies) before the quality of quantization deteriorates significantly and the number of sub-frames in the block. For example, in some embodiments, the minimum number of bits which can be used is 3 (though any other suitable number of minimum bits may be used). This may be represented by is Delta>=FRB*BM*M, where FRB=number of Fixed Rate Sub-bands in the sub-frame, BM=maximum number of bits that can be reduced from each TF tile and M=number of time blocks or time sub-frames.

Where the determination results in the answer that the difference is less than the quantization resolution reduction threshold value then the direction analyser/index generator 215 is configured to recalculate the number of bits used for fixed rate encoding by modifying the quantization resolution. In some embodiments the quantization resolution is reduced for each TF tile of the fixed rate encoded subbands up to the maximum BM bit reduction (in other words until the minimum number of bits to be used is reached) and until the number of bits for the frame is reduced to the available number of bits. In some embodiments the reduction is done 1 bit per TF at a time, such that the quantization resolution in the TF are uniformly affected. Furthermore in some embodiments the reduction is applied from the lower sub-bands to the higher sub-bands. The reduction is such that at the end of the quantization resolution reduction the number of used bits for the time-block is bits_EC1 rather than bits_EC. In other words the reduction is such that 'bits_EC1' should correspond to 'bits_available'

After applying the quantization resolution for the fixed rate sub-frames then the encoder 217 is configured to use the (bits_EC1) Encoded Direction Indices and signal which subframes are Entropy encoded and which are Fixed rate encoded. For example in some embodiments the encoder is configured to signal 1 bit to indicate that the EC+Fixed rate method is used, also 1 bit per sub-band to is then used to indicate whether the sub-band is Fixed rate or Entropy encoded. Then the encoded sub-bands are grouped. For example the entropy encoded sub-bands are grouped and then the fixed rate encoded sub-bands follow.

Where the determination results in the answer that the difference is greater than or equal to the quantization resolution reduction threshold value then the direction analyser/index generator 215 is configured to reduce an allocation of the number of bits for quantization bits_dir1[0:N−1][0:M−1] such that such that the sum of the allocated bits equals the number of available bits left after encoding the energy ratios.

Furthermore the direction analyser/index generator 215 can then be configured to start a sub-band encoding using the reduced number of available bits after encoding the energy ratios. This differs from the quantization resolution reduction above in that both the fixed rate and the variable (entropy encoded) forms are encoded again.

The reduced rate encoded direction indices and signalled use of fixed rate encoded sub-bands can then be encoded at the encoder 217. In other words a bit can be used to signal whether the sub-band was encoded using the entropy or fixed rate method used and the bits for encoded sub-bands are then sent.

Figure 4B:
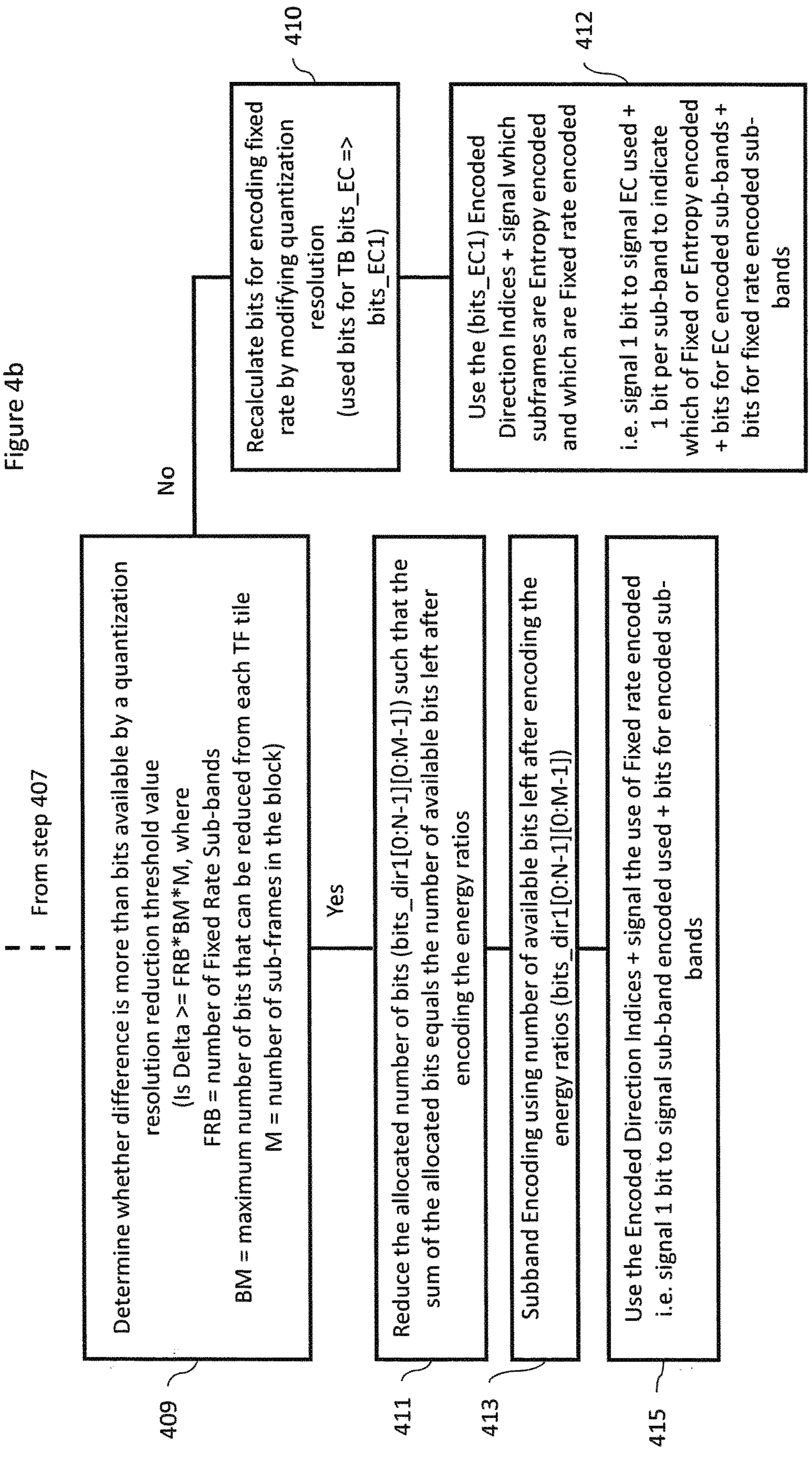

This is shown for example in FIG. 4*b* where following from step 407 there is the operation of determining whether the difference is more than bits available by a quantization resolution reduction threshold value as shown in FIG. 4*b* by step 409.

Where the difference is less than the quantization resolution reduction threshold then the method is configured to recalculate the number of bits for encoding fixed rate sub-bands by modifying the quantization resolution for the fixed rate encoded sub-bands (in other words not changing the entropy encoded sub-bands) as shown in FIG. 4*b* by step 410.

Having recalculated the number of bits for encoding the fixed rate sub-bands, then the bits are output where the encoded direction indices are used (with the modified quantization resolution fixed rate sub-frames) and furthermore the selections signalled (in other words indicators generated to signal which subframes are Entropy encoded and which are Fixed rate encoded) as shown in FIG. 4*b* by step 412. In some embodiments the using 1 bit to signal that the EC selection method is used, using 1 bit per sub-band to indicate which are Fixed or Entropy encoded and then grouping the encoded metadata such that all of the entropy encoded sub-bands are packed in the bitstream first and then then the modified resolution fixed rate encoded sub-bands packed after.

In some embodiments the reduced bitrate encoding may be implemented by starting a loop for each sub-band up to the penultimate sub-band N−1. Within this loop an allowed number of bits for the current sub-band is determined bits_allowed=sum(bits_dir1[i][0:M−1]). Then having determined the number of allowed number of bits for the current sub-band the direction analyser/index generator 215 can be configured to encode the indices by using fixed rate encoding with the reduced allocated number of bits bits_fixed=bits_allowed.

The direction analyser/index generator 215 can then be configured to select either the fixed rate encoding or using entropy coding based on the method which uses fewer bits, i.e. select the lowest of bits_fixed or bits_ec. Furthermore the direction analyser/index generator 215 can then be configured to use one bit to indicate which of the two encoding methods have been selected. The number of bits used for the sub-band encoding is therefore nb=min(bits_fixed, bits_ec)+1.

The direction analyser/index generator 215 can then be configured to determine whether there are bits available with respect to the allowed bits, in other words if diff=allowed_bits−nb>0. Where there is a difference between the number of bits available and the number of bits used in the sub-band then the difference diff can be distributed to the later sub-bands, for example by updating bits_dir1[i+1:N−1][0_M−1], else the direction analyser/index generator 215 can be configured to subtract a bit from the next sub-band allocation bits_dir1[i+1][0].

For the final sub-band N the direction analyser/index generator 215 can be configured to encode the direction indices using the fixed rate encoding method and using bits_dir1[N−1][0:M−1] bits.

Figure 4C:
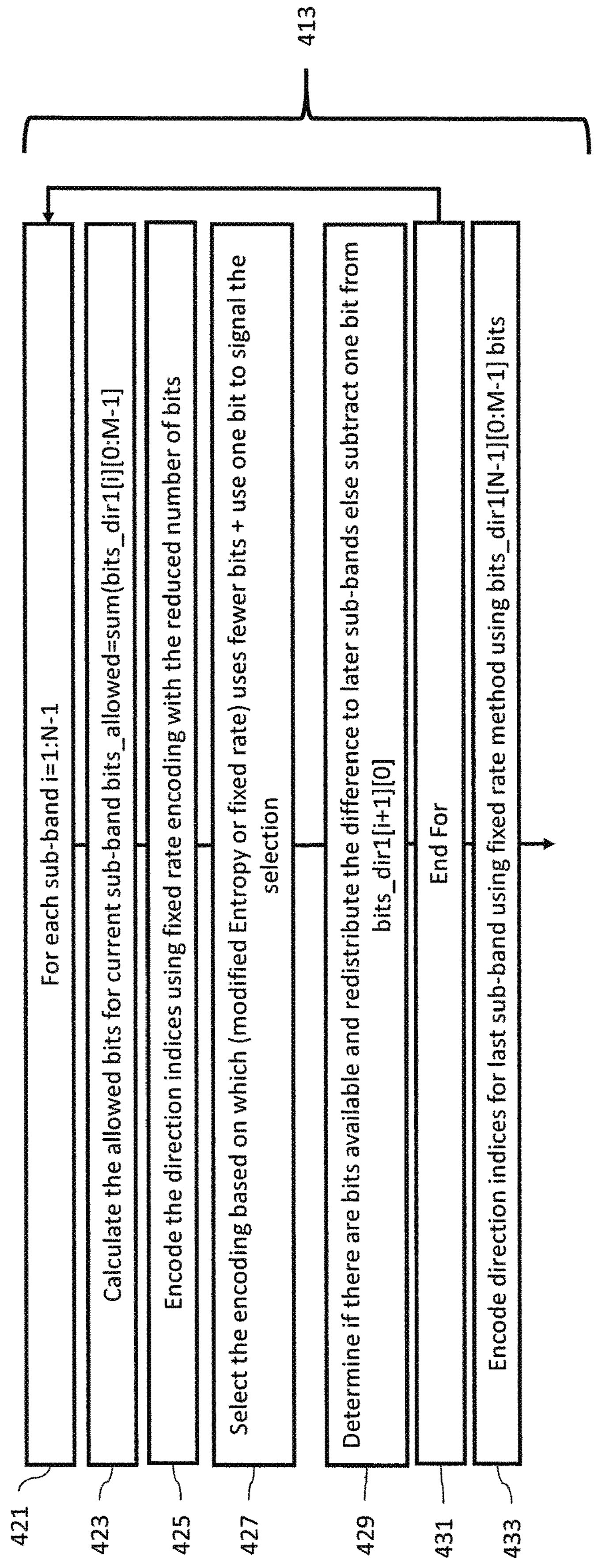

As shown in FIG. 4*c* these reduced bit rate operations (in other words step 413 in FIG. 4*b*) can be shown as an example flow diagram. The first step is one of starting a loop for the sub-bands from 1 to the penultimate (N−1) sub-band as shown in FIG. 4*c* by step 421.

Within the loop, for the current sub-band, the number of allowed bits for encoding is determined as shown in FIG. 4*c* by step 423.

Then a fixed rate encoding method is used to encode the indices using the reduced number of bits as shown in FIG. 4*c* by step 425.

Either the fixed rate encoding or the entropy encoding is then selected based on which method uses fewer bits and the selection furthermore can be indicated by a single bit as shown in FIG. 4*c* by step 427.

The determination of whether there are any remaining bits available based on the difference between the number of allowed bits and the number of bits used by the selected encoding and the redistribution of the remaining bits to the later sub-band allocations is shown in FIG. 4*c* by step 429.

The loop is then completed and may then repeat for the next sub-band as shown in FIG. 4*c* by step 431.

Finally the last sub-band is encoded using a fixed rate method using the remaining allocation of bits as shown in FIG. 4*c* by step 433.

As such the method may be summarised in the following

1. For each sub-band i=1:N
   a. encode energy ratio value
   b. determine direction indices based on quantization resolution (for all the time block of the current sub-band) based on the encoded energy ratio value 3. End for
4. Entropy encode the direction indexes
5. Select for each sub-band whether the fixed rate (indices) or entropy encoded uses fewer number of bits, determine block bits used
6. If block bits used is more than bits available
   a. If difference between block bits used and bits available is less than quantization resolution modification threshold
      i. Recalculate bits used by modifying quantization resolution of fixed rate encoded sub-bands
      ii. Generate output based on signaled method, signaled selections and then grouped sub-bands based on whether they were encoded using fixed rate (modified quantization resolution) or entropy method
   b. Else
      i. Reduce the allocated number of bits, bits_dir1[0:N−1][0:M−1], such that the sum of the allocated bits equals the number of available bits left after encoding the energy ratios
      ii. Re-encode for each subband i=1:N−1
         1. Calculate allowed bits for current subband: bits_allowed=sum(bits_dir1[i][0:M−1])
         2. Encode the direction parameter indexes by using fixed rate encoding with the reduced allocated number of bits, bits_fixed=bits_allowed, or using an entropy coding, bits_ec; select the one using less bits and use one bit to tell the method: nb=min (bits_fixed, bits_ec)+1;
         3. If there are bits available with respect to the allowed bits: (if diff=allowed_bits−nb>0)
            a. Redistribute the difference, diff, to the following subbands, by updating bits_dir1[i+1:N−1][0_M−1]
         4. Else
            a. Subtract one bit from bits_dir1[i+1][0]
      iii. End for
      iv. Encode the direction parameter indexes for the last subband with the fixed rate approach using bits_dir1[N−1][0:M−1] bits.
   c. End if
7. Else
8. Generate output based on signaled method, signaled selections and then grouped sub-bands based on whether they were encoded using fixed rate or entropy method.
9. End In some implementations the optimisation of the entropy encoding of the elevation and the azimuth values can be performed separately and is described in further detail hereafter with respect to FIGS. 5 and 6.

Figure 5:
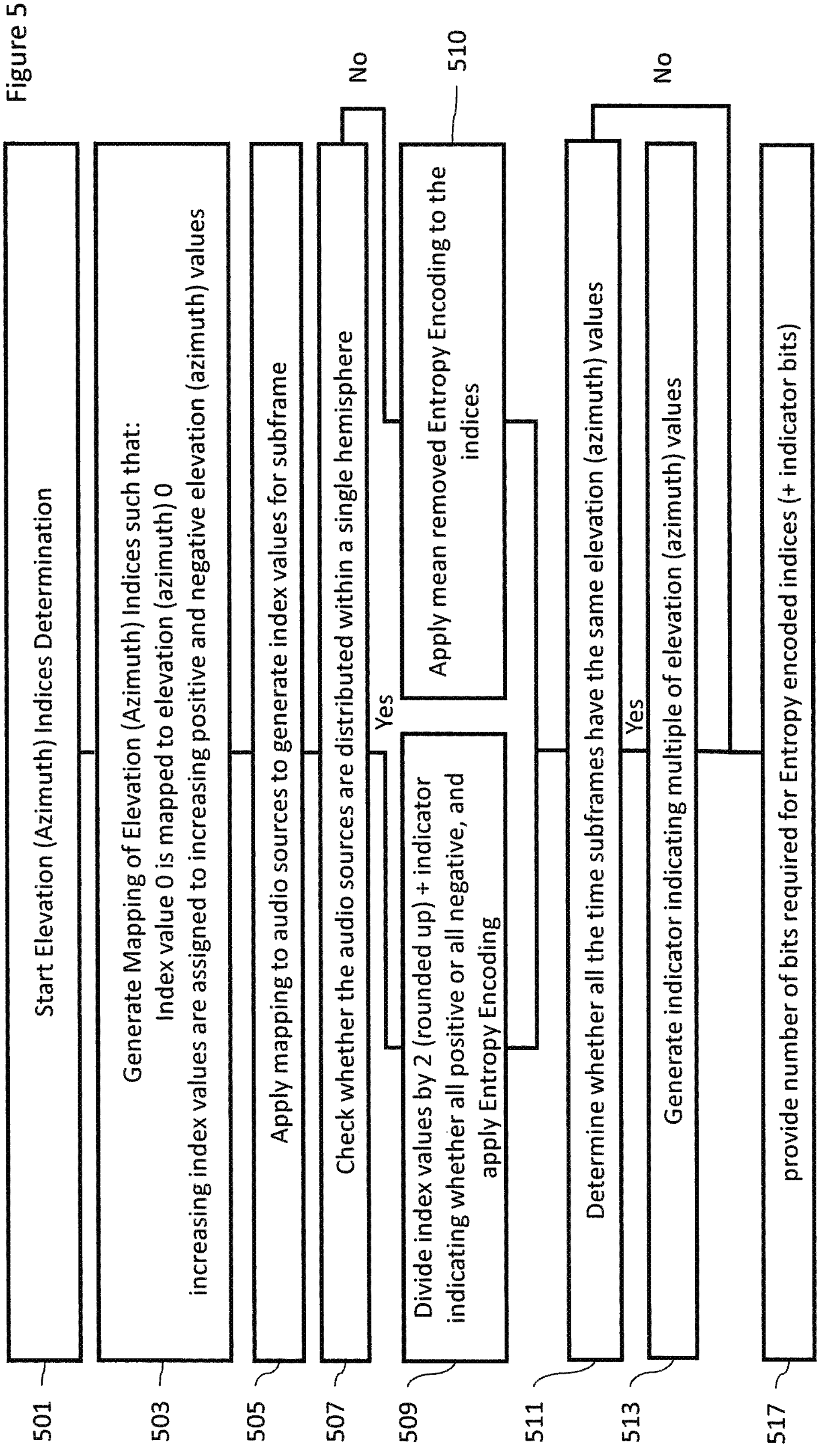
FIG. 5 shows a flow diagram of the entropy encoding of the direction indices as shown in FIGS. 4*a* to 4*c* according to some embodiments.

For example with respect to FIG. 5 is shown an example wherein in some embodiments a series of index checks and optimisations are applied in order to attempt to reduce the number of bits required to entropy encode the direction indices.

In some embodiments the direction indices determination is started as shown in FIG. 5 by step 501. In this example the bits required for entropy encoding the indices determination shown is an elevation index determination. However as described later a similar approach may be applied to the azimuth index determination.

In some embodiments a mapping is generated such that the elevation (or azimuth) value of 0 has an index of 0 and the increasing index values are assigned to increasing positive and negative elevation (azimuth) values as shown in FIG. 5 by step 503.

Having generated the mapping then the mapping is applied to the audio sources (for example in the form of generating a codeword output based on a lookup table) as shown in FIG. 5 by step 505.

The indices having been generated, in some embodiments there is a check performed to determine whether all of the indices are located within the same hemisphere as shown in FIG. 5 by step 507.

Where all of the indices are located within the same hemisphere then the index values can be divided by two (with a rounding up) and an indicator generated indicating which hemisphere the indices were all located within and then entropy encoding these values as shown in FIG. 5 by step 509.

Where all of the indices are not located within the same hemisphere then a mean removed entropy encoding can be applied to the indices. A mean removed entropy encoding may be configured to remove first the average index value for the subframes to be encoded, then remap the indices to positive ones and then encode them with a suitable entropy encoding, such as Golomb Rice encoding as shown in FIG. 5 by step 510.

After applying entropy encoding, in some embodiments a check can be applied to determine whether all of the time subframes have the same elevation (azimuth) value or index as shown in FIG. 5 by step 511.

Where all of the time subframes have the same elevation (azimuth) value or index then an indicator is generated indicating the multiple of elevation (azimuth) value or index as shown in FIG. 5 by step 513 otherwise the method passes directly to step 517.

The next operation is one of providing the number of bits required for the entropy encoded indices and any indicator bits as shown in FIG. 5 by step 517.

For example with respect to elevation values, the index of the elevation can be determined from a codebook in the domain [−90; 90] which is formed such that an elevation with a value 0 returns a codeword with index zero and alternatively assigns increasing indexes to positive and negative codewords distancing themselves from the zero elevation value.

Thus as an example in some embodiments there is implemented a codebook with the codewords {−90, −60, −30, 0, 30, 60, 90} which produces the indexes {6, 4, 2, 0, 1, 3, 5}. This indexing produces lower valued indexes for directions that are more probable in a general sense (where in practical examples the directions are near the Equator). Another observation is that if the audio sources are further away from the Equator, corresponding to higher values indexes, they tend to be all above or all under the Equator. In some embodiments the encoder can be configured to check whether all of the audio sources are above (or all of the audio sources are below) the equator and where this is the case for all time subframes for a subband then dividing the indices by 2, in order to generate smaller valued indices which can be more efficiently encoded.

In some embodiments the estimation of the number of bits for the elevation indices can be implemented in C as follows:

```
static short bits_ec_elevation_subband(unsigned short * elevation_index,
   unsigned short * azimuth_index, /* will be used later */
   short energy_ratio_index,
   short * GR_ord_elevation,
   short * same,
   short no_subframes,
   unsigned short * av_el,
   unsigned short * mr_idx,
   short * pos)
{
   short i;
   short nbits, nbits1;
   short ord_temp;
   short odd_even_flag;
   short written_bits;
   short data, bits_crt;
   nbits = 0;
   nbits1 = 0;
   *GR_ord_elevation = GR_ORD_EL;
   odd_even_flag = −1;
   if (energy_ratio_index > LIMIT_ER_ELEVATION_ENC) /* LIMIT_ER_ELEVATION_ENC = 4*/
   {
      nbits = mean_removed_GR(elevation_index, no_subframes, 1, GR_ord_elevation,
av_el, mr_idx);
      nbits += GR_bits(av_el, 1, GR_ORD_EL, 0, &ord_temp); /* GR_ORD_EL = 1;*/
   }
   else
   {
      nbits = odd_even_mean_removed_GR(elevation_index, no_subframes, 1,
GR_ord_elevation, av_el, mr_idx, &odd_even_flag);
      nbits += GR_bits(av_el, 1, GR_ORD_EL, 0, &ord_temp);
   }
   ord_temp = *GR_ord_elevation;
   *same = 1;
   for (i = 1; i < no_subframes; i++)
   {
      *same = (*same)*(elevation_index[i] == elevation_index[0]);
   }
   written_bits = *pos;
   if (*same == 1)
   {
        /* same data */
        data = GR_data(elevation_index[0], GR_ORD_EL, &bits_crt, 0);
        nbits = 1 + bits_crt;
   }
   else
   {
        /* not same data */
        nbits = nbits + 1;
   }
}
```

A special case of same elevation values for all the time subframes is also checked and signalled.

The function mean_removed_GR( ) in the above example is configured to remove first the average index value for the subframes to be encoded, then remap the indices to positive ones and then encodes them with Golomb Rice encoding.

This can be implemented, for example in C language, by the following:

```
static short mean_removed_GR(unsigned short* idx,
   short len,
   short adapt_GR,
   short* GR_ord,
   unsigned short * p_av,
   unsigned short * mr_idx)
{
   unsigned short av;
   short i, nbits;
   short sh_idx[5];
   av = (unsigned short)truncf(sum_s((short*)idx, len) / (float)len);
   *p_av = av;
   for (i = 0; i < len; i++)
   {
      sh_idx[i] = idx[i] − av;
```

-continued

```
}
for (i = 0; i < len; i++)
{
   if (sh_idx[i] < 0)
   {
      sh_idx[i] = −2 * sh_idx[i];
   }
   else if (sh_idx[i] > 0)
   {
      sh_idx[i] = sh_idx[i] * 2 − 1;
   }
   else
   {
      sh_idx[i] = 0;
   }
   mr_idx[i] = (unsigned short)sh_idx[i];
}
/* adapt_GR tells whether to try two values for the GR order or not */
nbits = GR_bits(mr_idx, len, *GR_ord, adapt_GR, GR_ord);
return nbits;
}
```

The function odd_even_mean_removed_GR( ) is configured to check first if all indexes are odd or if all are even, signals this occurrence and indicates the type (odd or even) after which it encodes the halved indices.

```
static short odd_even_mean_removed_GR(unsigned short* idx,
    short len,
    short adapt_GR,
    short* GR_ord,
    unsigned short* p_av,
    unsigned short * mr_idx,
    short *odd_even_flag)
{
    short av, i, nbits;
    short sh_idx[5];
    short odd, even;
    odd = 1;
    even = 1;
    *odd_even_flag = -1;
    for (i = 0; i < len; i++)
    {
        if (idx[i])
        {
            if (idx[i] % 2)
            {
                even = 0;
            }
            else
            {
                odd = 0;
            }
        }
    }
    if (even == 1)
    {
        *odd_even_flag = 0;
        for (i = 0; i < len; i++)
        {
            sh_idx[i] = idx[i] / 2;
        }
        nbits = 2; /* to tell if all are odd/even and which type they are */
    }
    else if (odd == 1)
    {
        *odd_even_flag = 1;
        for (i = 0; i < len; i++)
        {
            sh_idx[i] = (idx[i] - 1) / 2;
        }
        nbits = 2; /* to tell if all are odd/even and which type they are */
    }
    else
    {
        nbits = 1;
        for (i = 0; i < len; i++)
        {
            sh_idx[i] = idx[i];
        }
    }
    av = (short)truncf(sum_s(sh_idx, len) / (float)len);
    *p_av = av;
    for (i = 0; i < len; i++)
    {
        sh_idx[i] = sh_idx[i] - av;
    }
    for (i = 0; i < len; i++)
    {
        if (sh_idx[i] < 0)
        {
            sh_idx[i] = -2 * sh_idx[i];
        }
        else if (sh_idx[i] > 0)
        {
            sh_idx[i] = sh_idx[i] * 2 - 1;
        }
        else
        {
            sh_idx[i] = 0;
        }
        mr_idx[i] = (unsigned short)sh_idx[i];
```

-continued

```
    }
    nbits += GR_bits(mr_idx, len, *GR_ord, adapt_GR, GR_ord);
    return nbits;
}
```

Figure 6:
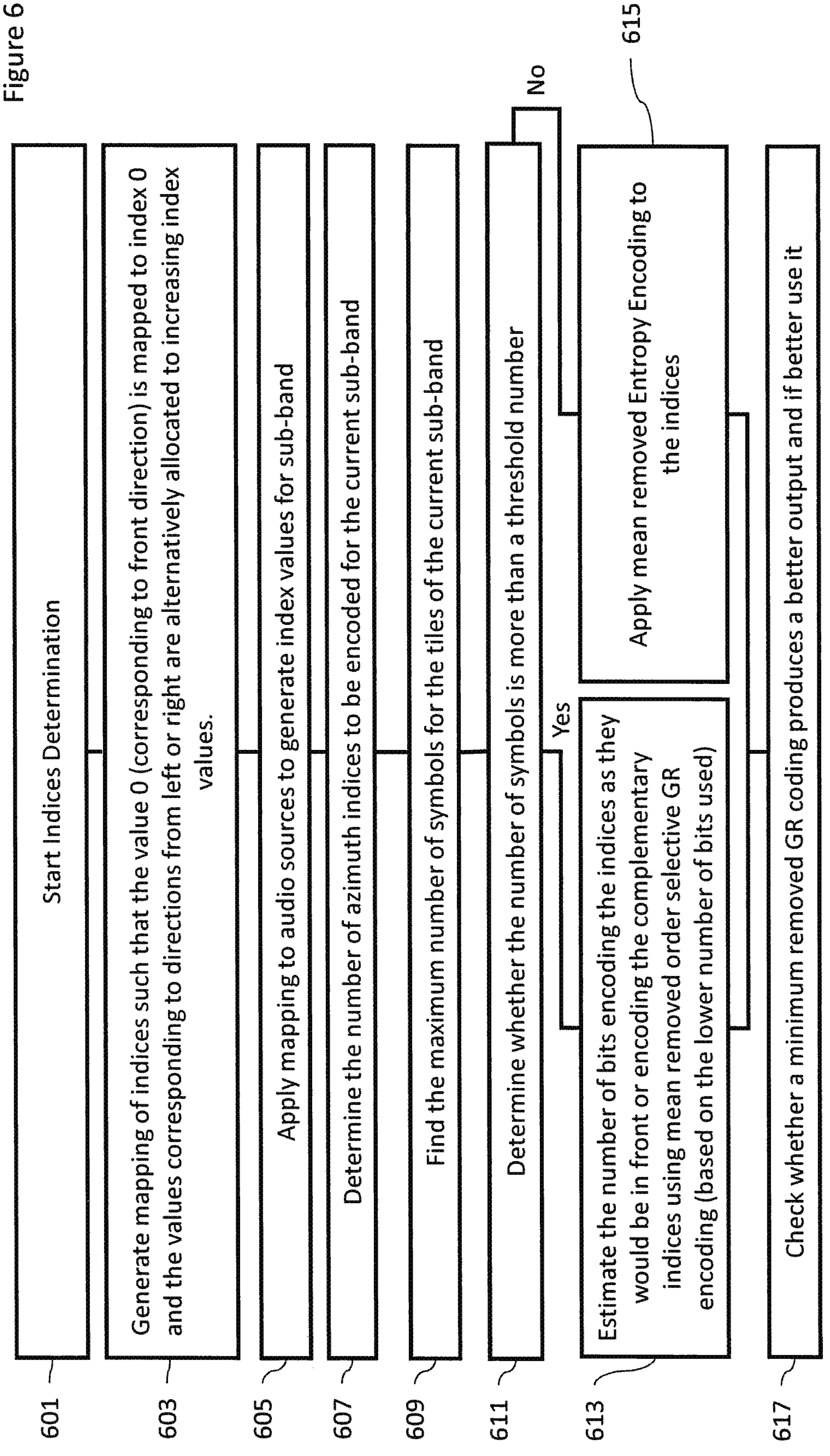
FIG. 6 shows a further flow diagram of the entropy encoding of the direction indices as shown in FIGS. 4*a* to 4*c* according to some embodiments.

In some embodiments a series of entropy encoding optimisation operations are performed and then the lowest value is selected. This for example can be shown with respect to the encoding of azimuth values and as shown in FIG. 6. In some embodiments the direction indices determination is started as shown in FIG. 6 by step 601.

In some embodiments a mapping is generated such that the azimuth value of 0 has an index of 0 and the increasing index values are assigned to increasing positive and negative azimuth values as shown in FIG. 6 by step 503.

Having generated the mapping then the mapping is applied to the audio sources (for example in the form of generating a codeword output based on a lookup table) as shown in FIG. 6 by step 605.

In this example, the index of the azimuth can be determined from a further codebook. In this example the zero value for the azimuth corresponds to a reference direction which may be the front direction, and positive values are to the left and negative values to the right. In this example the index of the azimuth value is assigned such that the values (−150, −120, −90, −60, −30, 0, 30, 60, 90, 120, 150, 180) have assigned the following indices (10, 8, 6, 4, 2, 0, 1, 3, 5, 7, 9, 11). In some embodiments the odd/even approach can be checked for the azimuth (corresponding to left/right positioning).

In this example the higher index values are assigned to values from the back or rear of the 'capture environment'.

The encoding of the azimuth indexes of a subframe can in some embodiments be performed based on the following:

1. Determine the number of azimuth indices to be encoded for the current subband (as shown in FIG. 6 by step 607)
2. Find the maximum number of symbols for the tiles of the current subband (as shown in FIG. 6 by step 609)
3. If there are more symbols than a threshold (as shown in FIG. 6 step 611)
    a. Encode (as shown in FIG. 6 by step 613) the azimuth values by checking the encoding of the values given by the complementary values: no_symb-index_azimuth.
        i. Estimate the number of bits if encoding the indexes as they would be in front. Use mean removed order selective Golomb Rice coding. The GR order may be 2 or 3. The GR order can also be set to different values, depending of the default range for the number of symbols.
        ii. Estimate the number of bits if encoding the complementary indexes using mean removed order selective GR coding.
        iii. Use the encoding method that uses the fewer number of bits and use a bit to signal which method is used
4. Else
    a. Encode the azimuth indexes using a mean removed GR coding with order 1 or 2 (as shown in FIG. 6 by step 615).
5. End
6. Check whether a minimum removed GR coding produces a better output and if better use it (as shown in FIG. 6 by step 617)

In C language the encoding looks like in the following:

```
static short bits_ec_azimuth_subband(unsigned short * elevation_index,
   unsigned short * azimuth_index,
   unsigned short energy_ratio_index,
   unsigned short *bits_sph_idx,
   short * GR_ord_azimuth,
   short * use_context,
   short no_subframes,
   unsigned short * av_az,
   unsigned short * mr_idx,
   unsigned int * temp_buffer,
   short * pos,
   short no_symb_azi[MASA_SUBFRAMES]
)
{
   unsigned short j;
   short j_az = 0;
   unsigned short az[MASA_SUBFRAMES];
   short min_el_idx;
   short nbits, nbits1;
   short GR_ord_azimuth1;
   short use_sign;
   short data, min;
   short written_bits, bits_crt;
   short ord_temp;
   short odd_even_flag;
   odd_even_flag = -1;
   for (j = 0; j < no_subframes; j++)
   {
      if (azimuth_index[j] < NO_INDEX) /* NO_INDEX corresponds to the case when
there is just one possible default value for the quantized value, so there is no need
to encode it */
      {
         az[j_az] = azimuth_index[j];
         j_az++;
      }
   }
   /* find min elevation index; the number of azimuth values are larger for lower
elevation indexes (lower elevation in absolute value) */
   min_el_idx = 1000;
   for (j = 0; j < no_subframes; j++)
   {
      if (elevation_index[j] < min_el_idx)
      {
         min_el_idx = elevation_index[j];
      }
   }
   /* try the mean removed approach */
   *GR_ord_azimuth = GR_ORD_AZ; /* GR_ORD_AZ = 2 */
   use_sign = 0;
   if ( (energy_ratio_index > LIMIT_ER_ELEVATION_ENC) && (no_phi[bits_sph_idx[0] -
1][min_el_idx] < LIMIT_NO_PHI)) /* LIMIT_ER_ELEVATION_ENC = 4; LIMIT_NO_PHI = 20 */
   {
      /* when there are fewer possible symbols for the encoded azimuth values, it
is less efficient to use a bit to check front/back*/
      nbits1 = mean_removed_GR(az, j_az, 1, GR_ord_azimuth, av_az, mr_idx);
      nbits1 += GR_bits(av_az, 1, GR_ORD_AZ, 0, &ord_temp);
   }
   else
   {
      /* no_symb_azi is the number of symbols for the azimuth at the given quantized
elevation value, for each time frequency tile of the subband */
      *GR_ord_azimuth += 1;
      nbits1 = begin_end_mean_removed_GR(az, j_az, 1, GR_ord_azimuth, mr_idx,
&odd_even_flag, no_symb_azi);
   }
   nbits = GR_bits_azimuth_context(azimuth_index, no_subframes, GR_ORD_AZ,
elevation_index, bits_sph_idx, &GR_ord_azimuth1, use_context);
   written_bits = *pos;
   if (nbits < nbits1)
   {
      nbits += 1;
      *GR_ord_azimuth = GR_ord_azimuth1;
      /* write bit for not using mean removed */
      written_bits = write_in_bit_buff(temp_buffer, 0, written_bits, 1);
      if (*use_context < 0)
      {
         if (*use_context == -1)
         {
            /* regular GR coding */
```

-continued

```
            written__bits = write__in__bit__buff(temp__buffer, 0, written__bits, 1);
            written__bits = write__in__bit__buff(temp__buffer, GR__ORD__AZ −
GR__ord__azimuth1, written__bits, 1);
            for (j = 0; j < no__subframes; j++)
            {
               data = azimuth__index[j];
               if (data < NO__INDEX)
               {
                  data = GR__data(data, GR__ord__azimuth1, &bits__crt, 0);
                  written__bits = write__in__bit__buff(temp__buffer, data,
written__bits, bits__crt);
               }
            }
         }
         else if (*use__context == −2)
         {
            /* min removed GR coding */
            written__bits = write__in__bit__buff(temp__buffer, 1, written__bits, 1);
            written__bits = write__in__bit__buff(temp__buffer, GR__ORD__AZ − 1 −
GR__ord__azimuth1, written__bits, 1);
            /* find min */
            min = NO__INDEX;
            for (j = 0; j < no__subframes; j++)
            {
               if (azimuth__index[j] < min)
               {
                  min = azimuth__index[j];
               }
            }
            if (min == NO__INDEX)
            {
               printf("No azimuth data to be coded\n");
               exit(−1);
            }
            /* write min*/
            if (min < 8) /* the minimum is usedonly if it is lower than 8, but
this value can also be changed or taken out by using GR encoding for the minimum value
and have a variable number of bits the encoding of the minimum value.*/
            {
               written__bits = write__in__bit__buff(temp__buffer, min, written__bits,
3);
            }
            else
            {
               printf("Min is too big % d\n", min);
               exit(−1);
            }
            for (j = 0; j < no__subframes; j++)
            {
               data = azimuth__index[j] − min;
               if (data < NO__INDEX − min)
               {
                  data = GR__data(data, GR__ord__azimuth1, &bits__crt, 0);
                  written__bits = write__in__bit__buff(temp__buffer, data,
written__bits, bits__crt);
               }
            }
         }
         else
         {
            printf("Wrong use_context value\n");
            exit(−1);
         }
      }
      else
      {
         written__bits = 0;
         for (j = 0; j < no__subframes; j++)
         {
            data = azimuth__index[j];
            if (data < NO__INDEX)
            {
               switch (bits__sph__idx[j]) {
               case 0:
                  break;
               case 1:
                  written__bits = write__in__bit__buff(temp__buffer, data,
written__bits, 1);
                  break;
```

-continued

```
                case 2:
                  data = GR_data(data, GR_ORD_AZ - 1, &bits_crt, 0);
                  written_bits = write_in_bit_buff(temp_buffer, data,
written_bits, bits_crt);
                  break;
                default:
                  data = GR_data(data, GR_ORD_AZ, &bits_crt, 0);
                  written_bits = write_in_bit_buff(temp_buffer, data,
written_bits, bits_crt);
                  break;
                }
              }
            }
          }
        }
        else
        {
          nbits = nbits1 + 1;
          /* write bit for using mean removed */
          written_bits = write_in_bit_buff(temp_buffer, 1, written_bits, 1);
            /* write the begin_end flag */
          if ((no_phi[bits_sph_idx[0] - 1][min_el_idx] >= 20) || (energy_ratio_index <=
LIMIT_ER_ELEVATION_ENC))
          {
            written_bits = write_in_bit_buff(temp_buffer, odd_even_flag ,
written_bits, 1);
            /* write GR order selection */
            written_bits = write_in_bit_buff(temp_buffer, GR_ORD_AZ -
(*GR_ord_azimuth) + 1, written_bits, 1);
            for (j = 0; j < j_az; j++)
            {
              data = GR_data(mr_idx[j], *GR_ord_azimuth, &bits_crt, 0);
              written_bits = write_in_bit_buff(temp_buffer, data, written_bits,
bits_crt);
            }
          }
          else
          {
            /* write GR order selection */
            written_bits = write_in_bit_buff(temp_buffer, GR_ORD_AZ -
(*GR_ord_azimuth), written_bits, 1);
            for (j = 0; j < j_az; j++)
            {
              data = GR_data(mr_idx[j], *GR_ord_azimuth, &bits_crt, 0);
              written_bits = write_in_bit_buff(temp_buffer, data, written_bits,
bits_crt);
            }
            /* write mean */
            data = GR_data((short)(*av_az), GR_ORD_AZ, &bits_crt, 0);
            written_bits = write_in_bit_buff(temp_buffer, data, written_bits,
bits_crt);
          }
        }
        *pos = written_bits;
        return nbits;
        }
```

Figure 7:
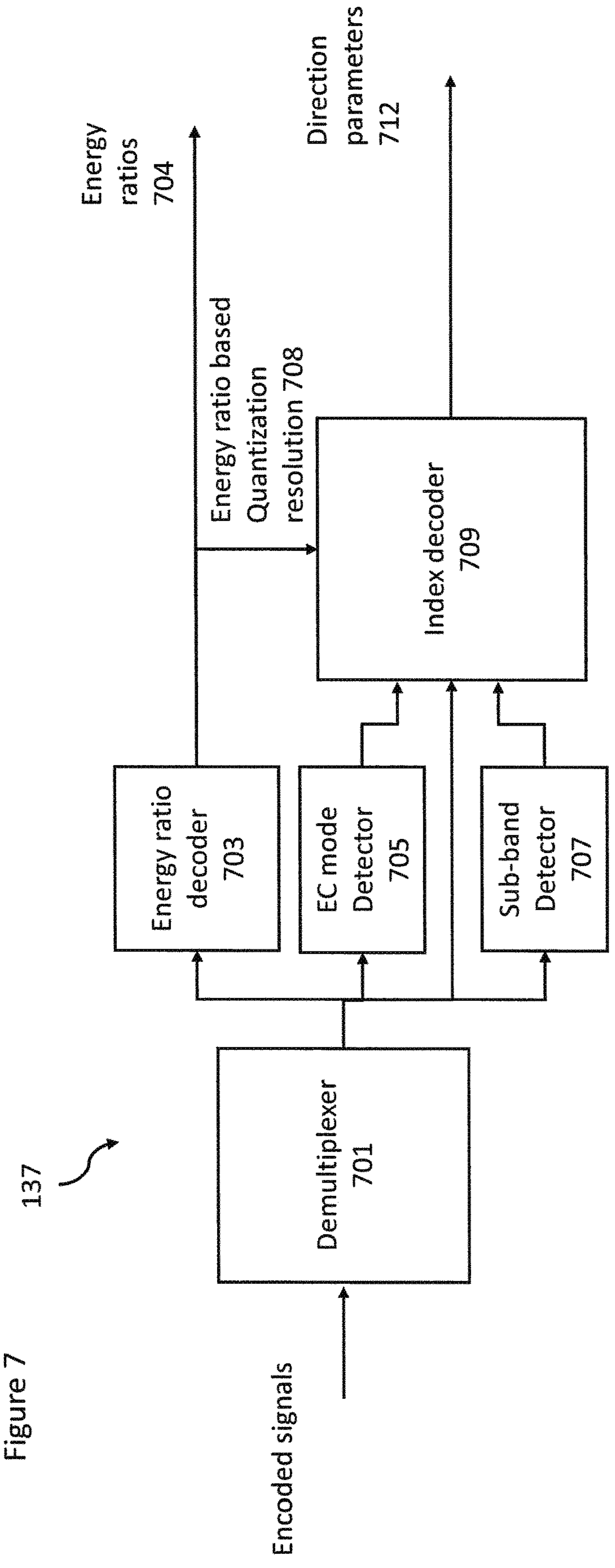
FIG. 7 shows schematically the metadata decoder according to some embodiments.

With respect to FIG. 7 is shown an example metadata extractor 137 suitable for decoding the encoded metadata as encoded by the encoder as shown in FIG. 2.

The metadata extractor 137 in some embodiments comprises a demultiplexer 701 configured to receive the encoded signals and output encoded energy ratio values to an energy ratio decoder 703, and output signalling bits to an entropy coding mode detector 705 and to a sub-band detector 707 and the encoded indices to an index decoder 709.

The metadata extractor 137 furthermore may comprise an energy ratio decoder 703 configured to receive and decode the encoded energy ratios in order to generate decoded energy ratios. The decoded energy ratios 704 may be output. The energy ratio decoder 703 may furthermore generate the energy ratio based quantization resolution value 708 based on the encoded energy ratio value and pass this to the index decoder and the direction index-direction value (AZ/EL) converter 711.

The metadata extractor 137 furthermore may comprise an entropy coding (EC) mode detector 705. The EC mode detector may read the first bit in the block which indicates whether the block has been encoded all in a fixed rate mode (in other whether the block contains the encoded index values and therefore there is no entropy decoding required) or whether the entropy-fixed rate hybrid encoding has been implemented for this block.

The entropy coding mode detector 705 may thus be configured to control the index decoder 709 based on the first bit (the mode indicator).

The metadata extractor 137 furthermore may comprise a sub-band detector 707. The sub-band detector 707 may read the next bits (for example where there are 5 sub-bands, there are 5 bits) in the block which indicates for the block which sub-bands have been encoded according to the fixed rate method and which sub-bands have been encoded according to the entropy method.

The sub-band detector 707 may thus be configured to control the index decoder 709 based on the read bits (the sub-band indicators).

The metadata extractor 137 furthermore may comprise an index decoder 709. The index decoder 709 having received the metadata encoded values for the sub-bands can be controlled by the sub-band detector 707 and entropy mode detector 705.

Thus for example the index decoder 709 can be configured to fixed rate decode the metadata encoded values when the mode indicator indicates that the hybrid mode is disabled.

Additionally the index decoder 709 can be configured to decode the entropy encoded sub-bands based on the sub-band indicators. Having read and decoded the entropy values the difference between the bits available and the bits read (the indicator bits and the entropy encoded direction index bits) is determined. The index decoder 709 is further configured to determine whether the difference is less than the number of bits required to fixed rate encode the remaining encoded sub-bands based on the energy ratio based quantization resolution value 708. In other words whether the difference (bits_available-bits_read)<sum(bits_dir0[i][j]), where i=index of fixed rate encoded subband, and j=0:M−1.

Where the difference is less than the number of bits assigned based on the energy ratio based quantization resolution value 708 then the index decoder is configured to determine whether the encoding has been implemented using the quantization resolution modification for the fixed rate sub-bands and the decoding is performed on the fixed rate sub-bands based on the reduced quantization resolutions determined in the same manner as implemented in the encoder. Where the difference is correct then the original resolution is used to decode the fixed rate sub-bands.

The decoded direction parameters 712 can then be output.

Thus in some embodiments there may be two reduction levels.

A finer reduction level (when the difference is small enough) which is signalled as follows:

The original number of bits for each time-frequency block is determined by the energy quantized ratio. First there is signalling of sub-band is using EC or fixed rate encoding. The sub-bands that are EC encoded were written first, therefore when reading them it is known how many bits they used. Also it is known the available number of bits and the predetermined number of bits for the fixed rate encoded sub-bands. If the pre-determined number of bits+the bits of the EC encoded sub-bands fit into the available bits, all is good, so there is no reduction; else there is a small reduction.

A coarser or "harsher" reduction where one bit at the beginning is sent to instruct the decoder to whether the bit allocation is reduced to the number of available bit limit or not (corresponding to step 411).

Figure 8:
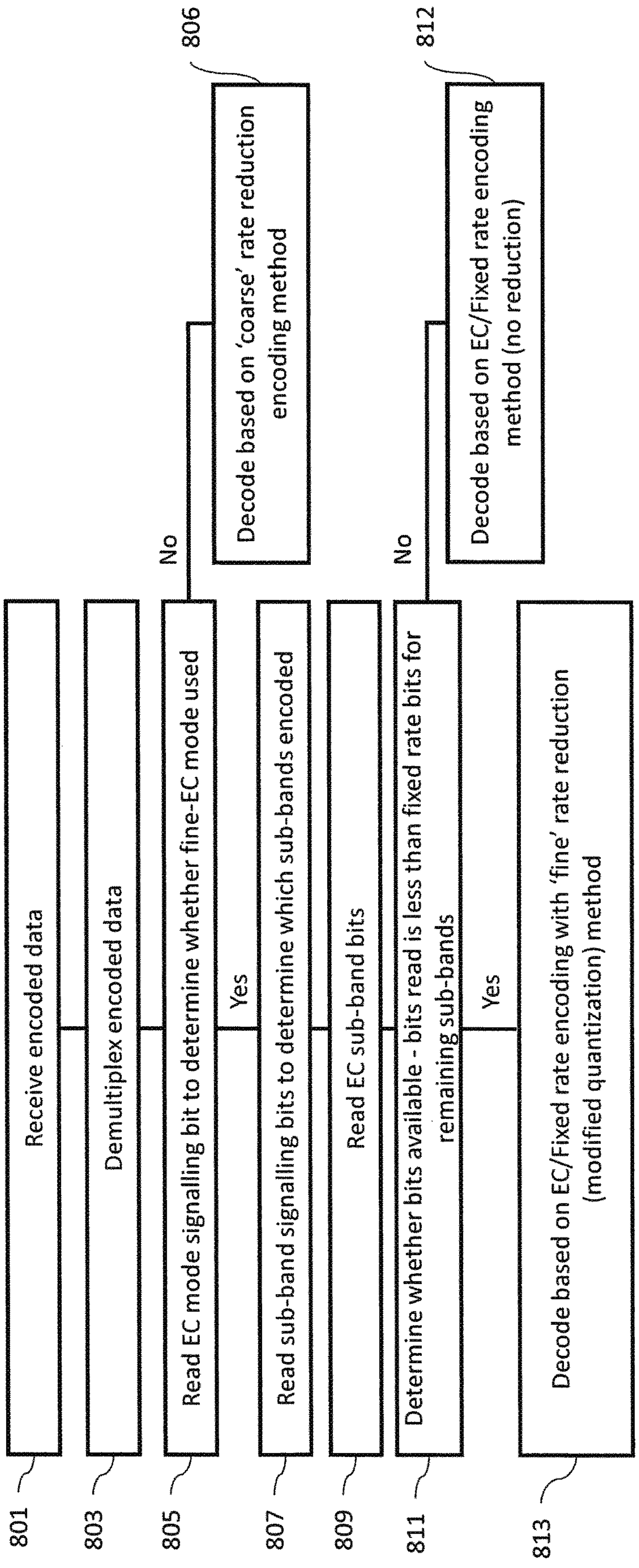
FIG. 8 show a flow diagram of metadata decoder operations as shown in FIG. 7 according to some embodiments.

FIG. 8 for example shows the operation of the metadata extractor as shown in FIG. 7 as a flow diagram.

Thus the method comprises receiving encoded data as shown in FIG. 8 by step 801.

The encoded data is demultiplexed as shown in FIG. 8 by step 803.

The EC mode signalling bit is then read to determine whether the hybrid entropy coding method has been employed and determine whether a fine-EC mode (or coarse-EC mode) encoding has been employed as shown in FIG. 8 by step 805.

Where the EC mode signalling bit indicates that a coarse rate reduction has been applied the decoding is performed based only on rate reduction based decoding (in some embodiments implementing the coarse rate reduced energy ratio quantization resolution) as shown in FIG. 8 by step 806.

Where the EC mode signalling bit indicates that a hybrid entropy-fixed rate encoding has been employed and that a fine rate reduction (modification of the quantization resolution only) or no rate reduction was required then the next operation is one of reading the sub-band signalling bits to determine which sub-bands were entropy encoded and which sub-bands where fixed rate encoded as shown in FIG. 8 by step 807.

The grouped entropy encoded sub-band bits are read and decoded generating direction indices which can be converted to directions based on the original energy ratio quantization resolution as shown in FIG. 8 by step 809.

The next operation is one of determining whether the difference between the bits available for the block and the bits read (the signalling and EC encoded bits) is less than the number of bits required to encode the remaining fixed rate bits according to the original energy ratio quantization resolution as shown in FIG. 8 by step 811.

Where the difference is less than the number of bits required then the decoding can be performed on the 'fine' rate reduction encoding based on the modified quantization resolution method as shown in FIG. 8 by step 813.

Where the difference is not less than (or equal to) the number of bits required then the decoding can be performed on the encoding based on the original quantization resolution method as shown in FIG. 8 by step 812.

Figure 9:
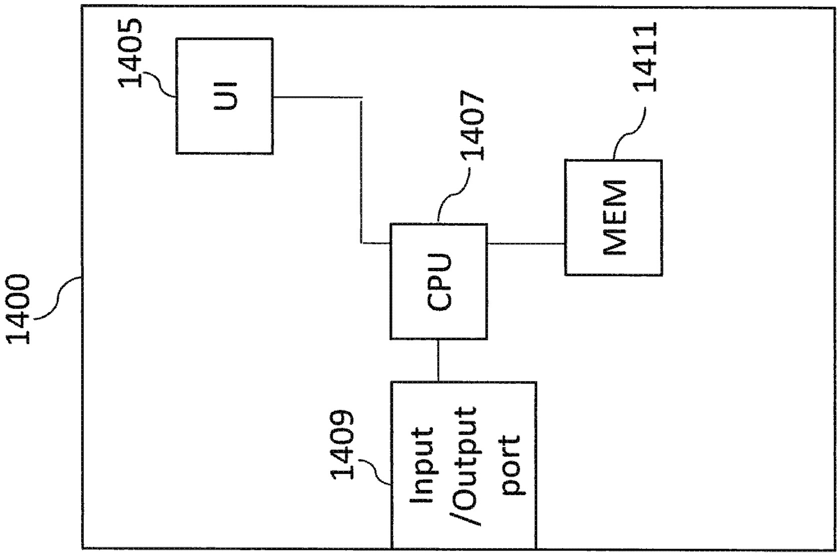
FIG. 9 shows schematically an example device suitable for implementing the apparatus shown.

With respect to FIG. 9 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus to:

generate spatial audio signal directional metadata parameters for time-frequency tiles of an audio frame;

generate encoded spatial audio signal directional metadata parameters for the time-frequency tiles of the audio frame based on a first quantization resolution;

compare a number of bits used for the encoded spatial audio signal directional metadata parameters for the time-frequency tiles of the audio frame based on the first quantization resolution against a determined number of bits;

output or store the encoded spatial audio signal directional metadata parameters for the time-frequency tiles of the audio frame based on the first quantization resolution when the number of bits used for the encoded spatial audio signal directional metadata parameters for the time-frequency tiles of the audio frame based on the first quantization resolution is less than the determined number of bits;

generate encoded spatial audio signal directional metadata parameters for the time-frequency tiles of the audio frame based on a second quantization resolution when the number of bits used for the encoded spatial audio signal directional metadata parameters for the time-frequency tiles of the audio frame based on the first quantization resolution is more than the determined number of bits and a difference between the determined number of bits and the number of bits used for the encoded spatial audio signal directional metadata parameters for the time-frequency tiles of the audio frame based on the first quantization resolution is less than the determined number of bits is within a determined threshold; and generate encoded spatial audio signal directional metadata parameters for the time-frequency tiles of the audio frame based on a third quantization resolution when the number of bits used for the encoded spatial audio signal directional metadata parameters for the time-frequency tiles of the audio frame based on the first quantization resolution is more than the determined number of bits and the difference between the determined number of bits and the number of bits used for the encoded spatial audio signal directional metadata parameters for the time-frequency tiles of the audio frame based on the first quantization resolution is greater than the determined threshold, wherein the third quantization resolution is determined such that a number of bits used for the encoded spatial audio signal directional metadata parameters for the time-frequency tiles of the audio frame based on the third quantization resolution is equal to or less than the determined number of bits.

2. The apparatus as claimed in claim 1, wherein the apparatus caused to generate encoded spatial audio signal directional metadata parameters for time-frequency tiles of the audio frame based on a first quantization resolution is caused to:

determine the first quantization resolution for mapping between values of the spatial audio signal directional metadata parameters and an index value;

generate indices associated with the spatial audio signal directional metadata parameters based on the mapping using the first quantization resolution; and selectively encode the indices using a fixed rate or entropy encoding based on whether the fixed rate or entropy encoding uses a fewer number of bits.

3. The apparatus as claimed in claim 2, wherein the apparatus caused to determine the first quantization resolution for mapping between the values of the spatial audio signal directional metadata parameters and the index value is caused to determine the first quantization resolution for mapping between the values of the spatial audio signal directional metadata parameters and the index value based on an energy ratio value associated with the spatial audio signal directional metadata parameters.

4. The apparatus as claimed in claim 2, wherein the apparatus caused to generate encoded spatial audio signal directional metadata parameters for the time-frequency tiles of the audio frame based on the second quantization resolution when the difference between the determined number of bits and the number of bits used for the encoded spatial audio signal directional metadata parameters for the time-frequency tiles of the audio frame based on the first quantization resolution is within the determined threshold is caused to: determine the second quantization resolution for mapping between the values of the spatial audio signal directional metadata parameters and the index value; and generate indices associated with the spatial audio signal directional metadata parameters based on the mapping using the second quantization resolution for spatial audio signal directional metadata parameters which were the fixed rate encoded using the first quantization resolution.

5. The apparatus as claimed in claim 4, the apparatus is further caused to output or store:

the entropy encoded indices associated with the spatial audio signal directional metadata parameters based on the mapping using the first quantization resolution for spatial audio signal directional metadata parameters; and the fixed rate encoded indices associated with the spatial audio signal directional metadata parameters based on the mapping using the second quantization resolution for spatial audio signal directional metadata parameters.

6. The apparatus as claimed in claim 5, wherein the apparatus is further caused to order the encoded indices such that the entropy encoded indices precede the fixed rate encoded indices.

7. The apparatus as claimed in claim 1, wherein the apparatus is further caused to generate an indicator when the first or second quantization resolution is used.

8. The apparatus as claimed in claim 1, wherein the apparatus caused to generate the encoded spatial audio signal directional metadata parameters for the time-frequency tiles of the audio frame based on the third quantization resolution is caused to:

determine the third quantization resolution for mapping between the values of the spatial audio signal directional metadata parameters and an index value based on a number of bits used for fixed rate encoding using the third quantization resolution is always equal to or less than the determined number of bits;

generate indices associated with the spatial audio signal directional metadata parameters based on the mapping using the third quantization resolution; and selectively encode the indices using a fixed rate or entropy encoding based on whether the fixed rate or entropy encoding uses a fewer number of bits.

9. The apparatus as claimed in claim 8, wherein the apparatus is further caused to output the selectively encoded indices using a fixed rate or entropy encoding based on whether the fixed rate or entropy encoding uses a fewer number of bits.

10. The apparatus as claimed in claim 1, wherein the apparatus is further caused to generate an indicator when the third quantization resolution is determined.

11. A method comprising:

generating spatial audio signal directional metadata parameters for time-frequency tiles of an audio frame;

generating encoded spatial audio signal directional metadata parameters for the time-frequency tiles of the audio frame based on a first quantization resolution;

comparing a number of bits used for the encoded spatial audio signal directional metadata parameters for the time-frequency tiles of the audio frame based on the first quantization resolution against a determined number of bits;

outputting or storing the encoded spatial audio signal directional metadata parameters for the time-frequency tiles of the audio frame based on the first quantization resolution when the number of bits used for the encoded spatial audio signal directional metadata parameters for the time-frequency tiles of the audio frame based on the first quantization resolution is less than the determined number of bits;

generating encoded spatial audio signal directional metadata parameters for the time-frequency tiles of the audio frame based on a second quantization resolution when the number of bits used for the encoded spatial audio signal directional metadata parameters for the time-frequency tiles of the audio frame based on the first quantization resolution is more than the determined number of bits and a difference between the determined number of bits and the number of bits used for the encoded spatial audio signal directional metadata parameters for the time-frequency tiles of the audio frame based on the first quantization resolution is less than the determined number of bits is within a determined threshold; and generating encoded spatial audio signal directional metadata parameters for the time-frequency tiles of the audio frame based on a third quantization resolution when the number of bits used for the encoded spatial audio signal directional metadata parameters for the time-frequency tiles of the audio frame based on the first quantization resolution is more than the determined number of bits and the difference between the determined number of bits and the number of bits used for the encoded spatial audio signal directional metadata parameters for the time-frequency tiles of the audio frame based on the first quantization resolution is greater than the determined threshold, wherein the third quantization resolution is determined such that a number of bits used for the encoded spatial audio signal directional metadata parameters for the time-frequency tiles of the audio frame based on the third quantization resolution is equal to or less than the determined number of bits.

12. The method as claimed in claim 11, wherein the method comprising generating encoded spatial audio signal directional metadata parameters for time-frequency tiles of the audio frame based on a first quantization resolution comprises:

determining the first quantization resolution for mapping between values of the spatial audio signal directional metadata parameters and an index value;

generating indices associated with the spatial audio signal directional metadata parameters based on the mapping using the first quantization resolution; and selectively encoding the indices using a fixed rate or entropy encoding based on whether the fixed rate or entropy encoding uses a fewer number of bits.

13. The method as claimed in claim 12, wherein the method comprising determining the first quantization resolution for mapping between the values of the spatial audio signal directional metadata parameters and the index value comprises determining the first quantization resolution for mapping between the values of the spatial audio signal directional metadata parameters and the index value based on an energy ratio value associated with the spatial audio signal directional metadata parameters.

* * * * *